July 31, 1934.    O. G. SIMMONS    1,968,469
GEAR SHAPER
Filed April 10, 1930    23 Sheets-Sheet 7

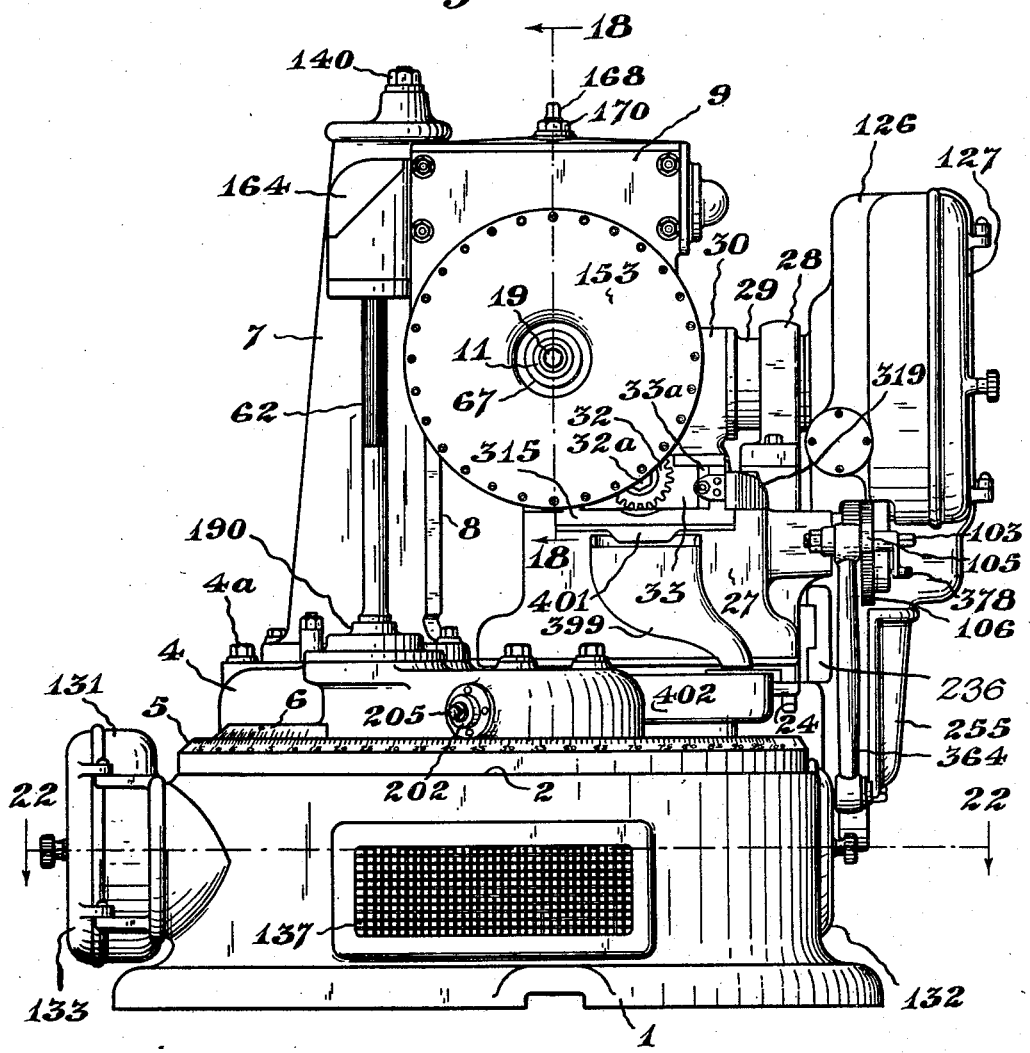

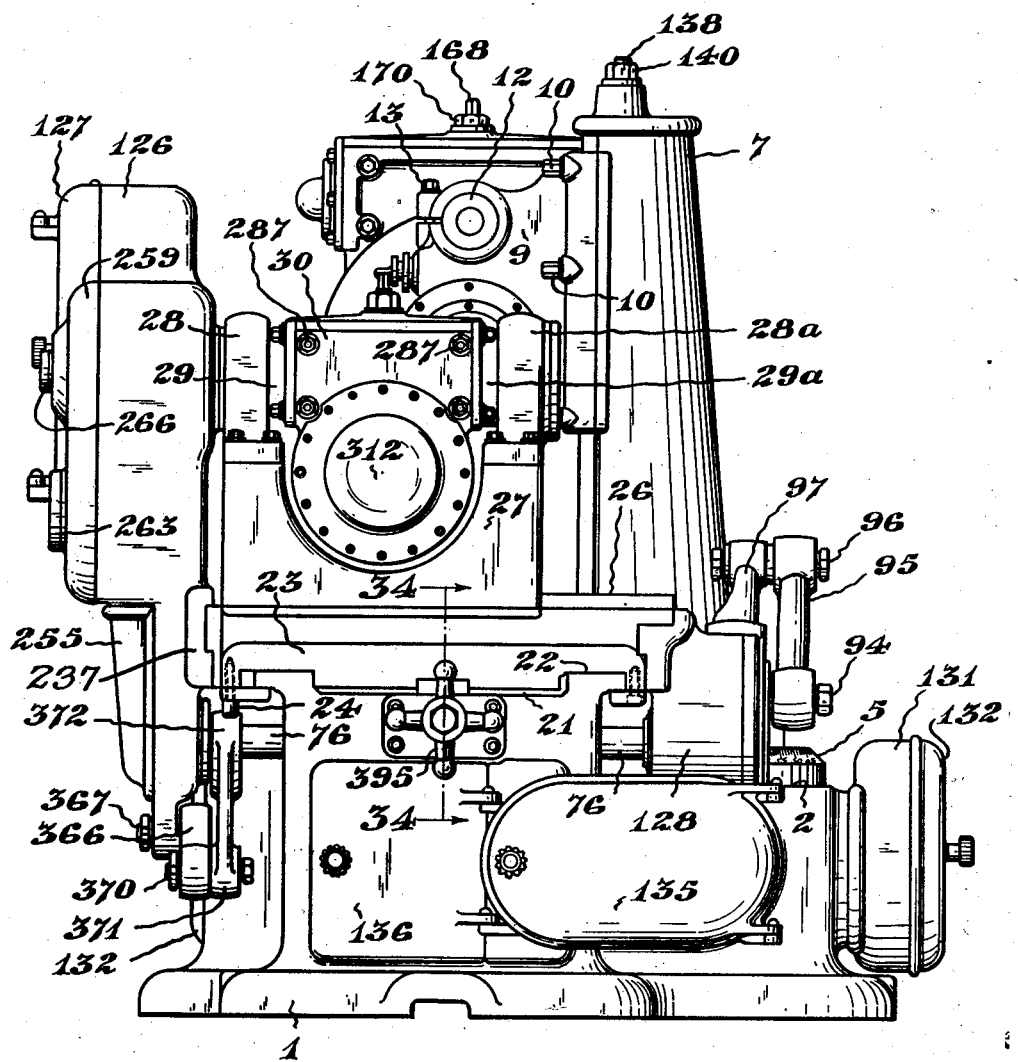

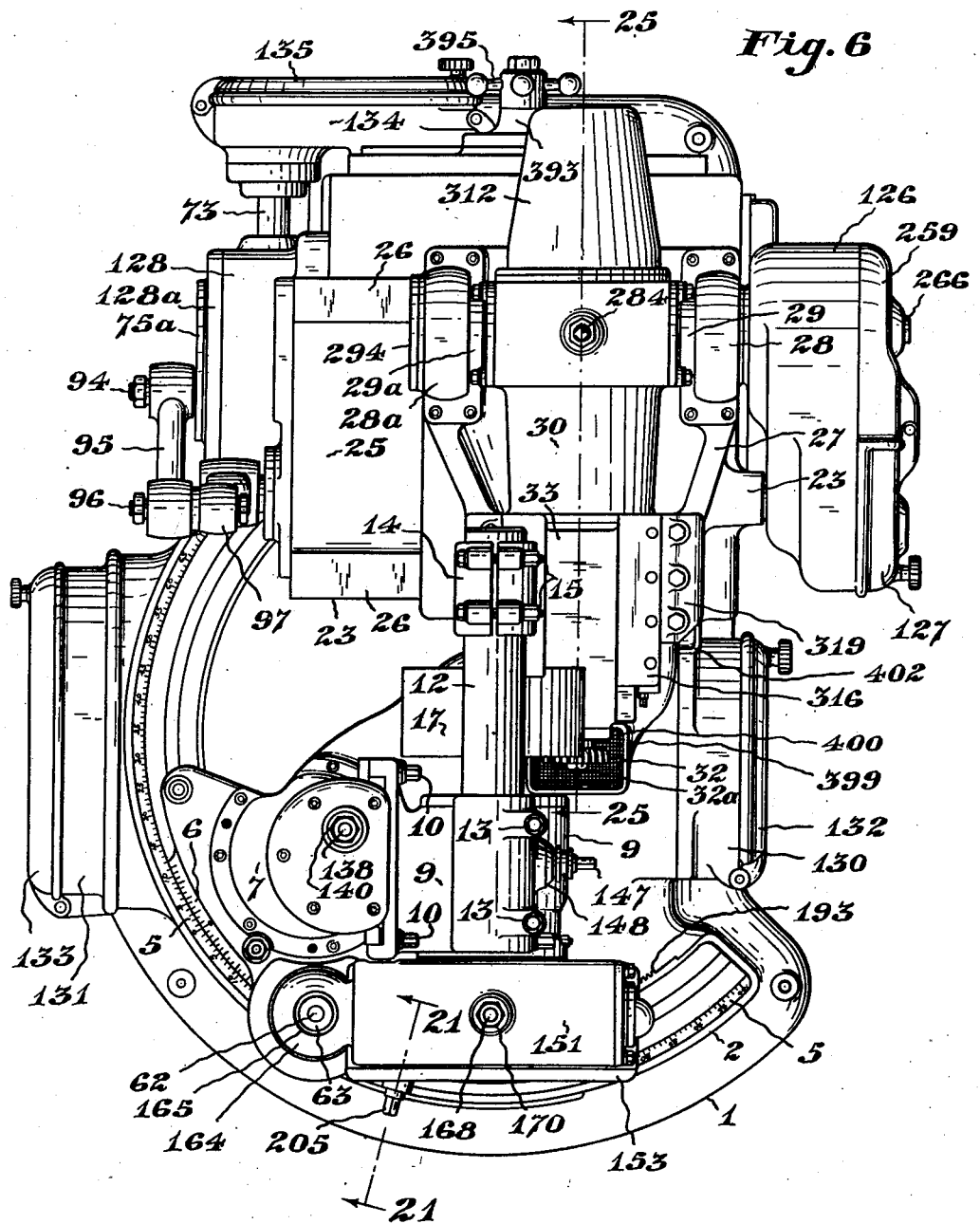

INVENTOR:
Oliver G. Simmons

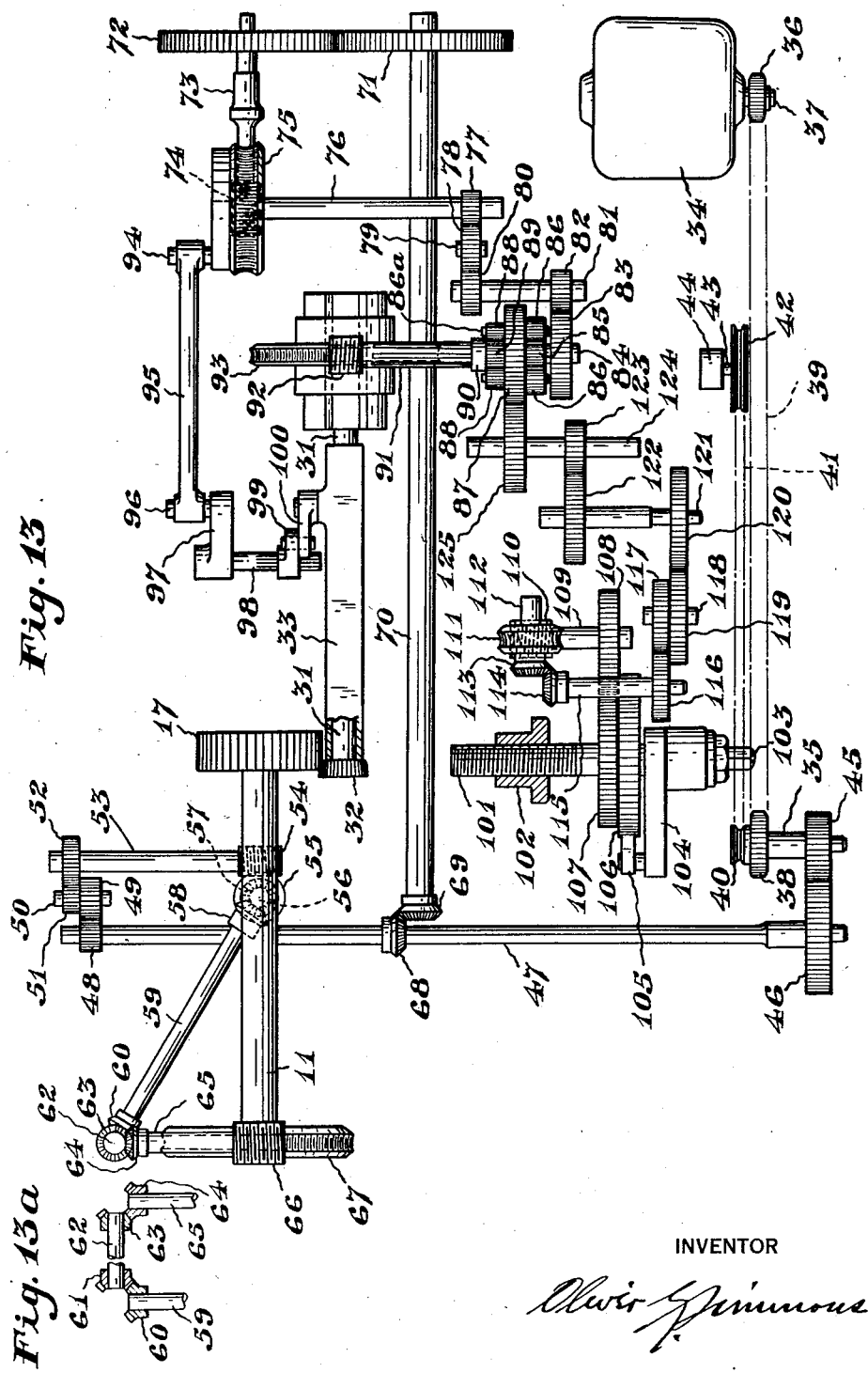

July 31, 1934.   O. G. SIMMONS   1,968,469
GEAR SHAPER
Filed April 10, 1930    23 Sheets-Sheet 9

INVENTOR
Oliver G. Simmons

July 31, 1934.  O. G. SIMMONS  1,968,469
GEAR SHAPER
Filed April 10, 1930   23 Sheets-Sheet 10
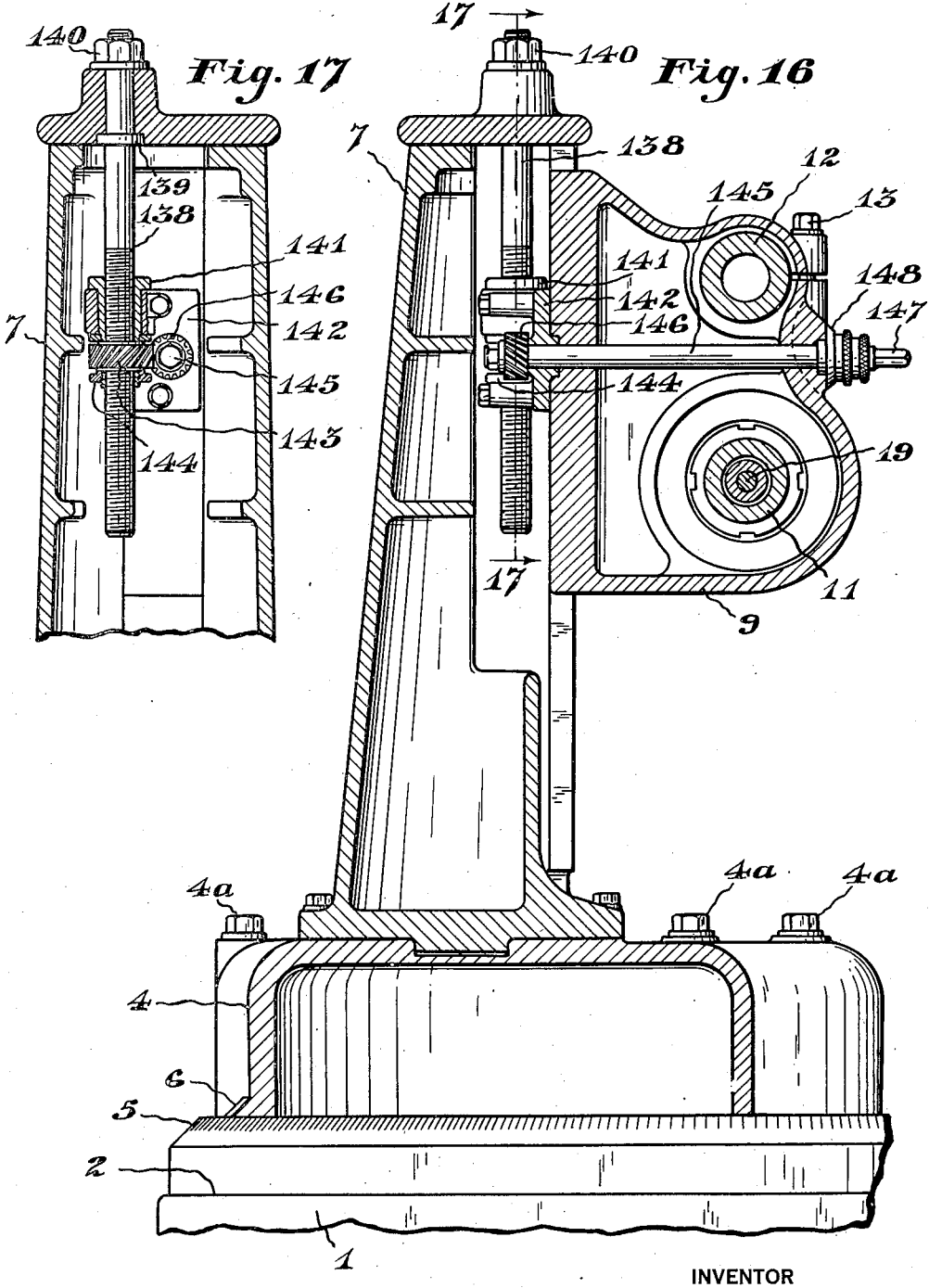
INVENTOR
Oliver G. Simmons

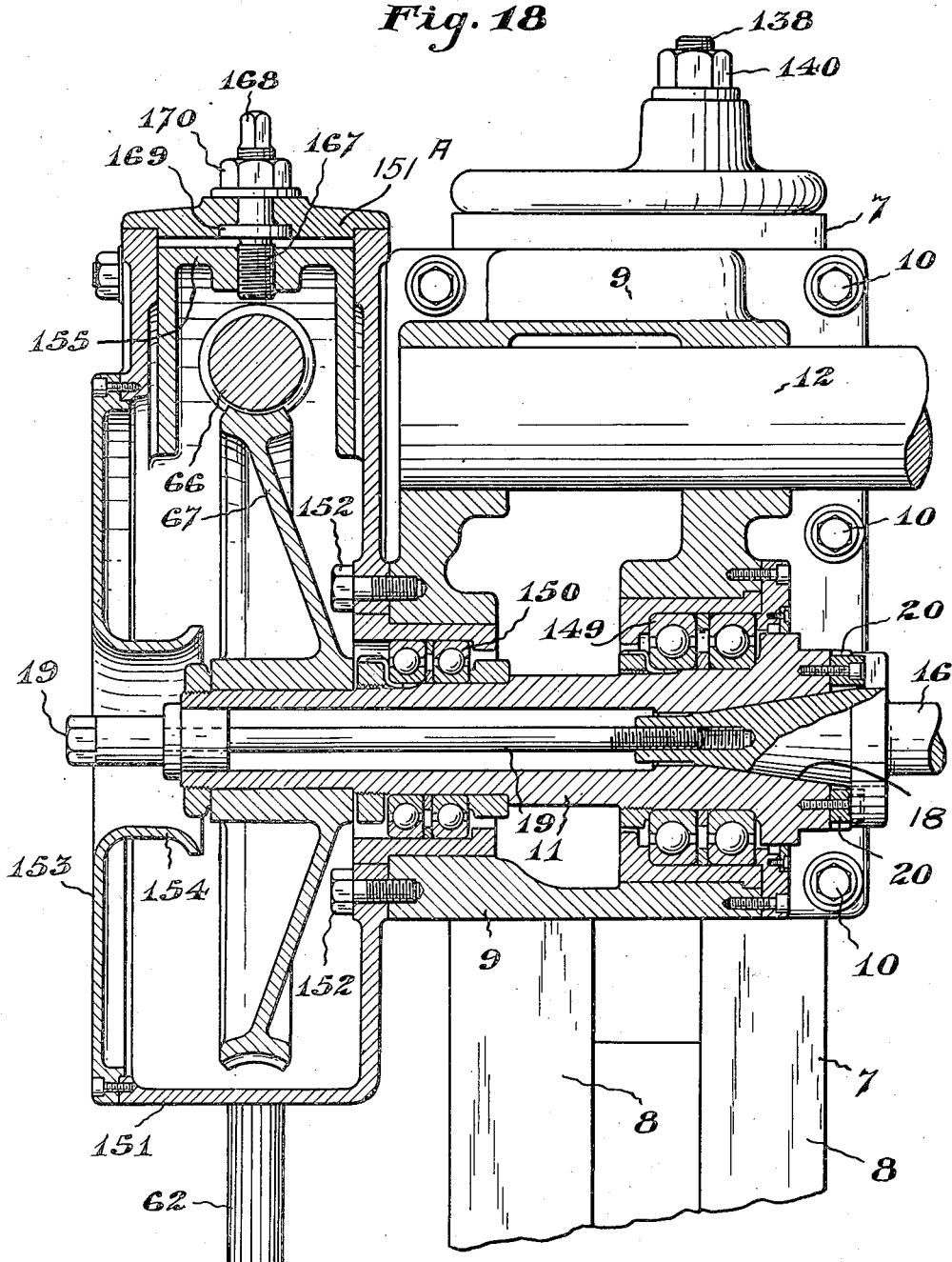

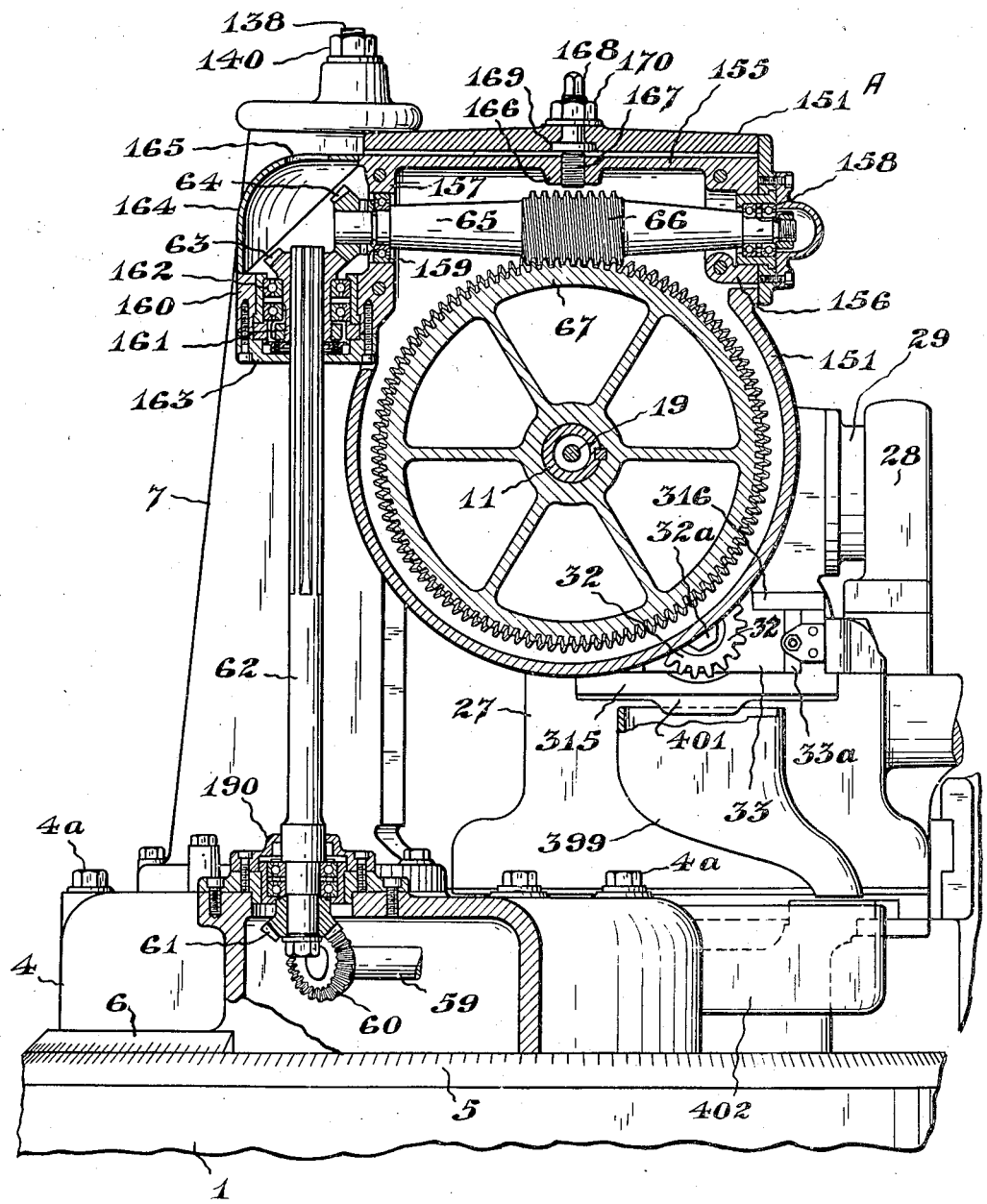

July 31, 1934.  O. G. SIMMONS  1,968,469
GEAR SHAPER
Filed April 10, 1930  23 Sheets-Sheet 13

INVENTOR
Oliver G Simmons

July 31, 1934.  O. G. SIMMONS  1,968,469
GEAR SHAPER
Filed April 10, 1930  23 Sheets-Sheet 14

INVENTOR

July 31, 1934.     O. G. SIMMONS     1,968,469
GEAR SHAPER
Filed April 10, 1930     23 Sheets-Sheet 15

Fig. 23

INVENTOR
Oliver G. Simmons

July 31, 1934.　　　O. G. SIMMONS　　　1,968,469
GEAR SHAPER
Filed April 10, 1930　　23 Sheets-Sheet 19

INVENTOR:
Oliver Simmons

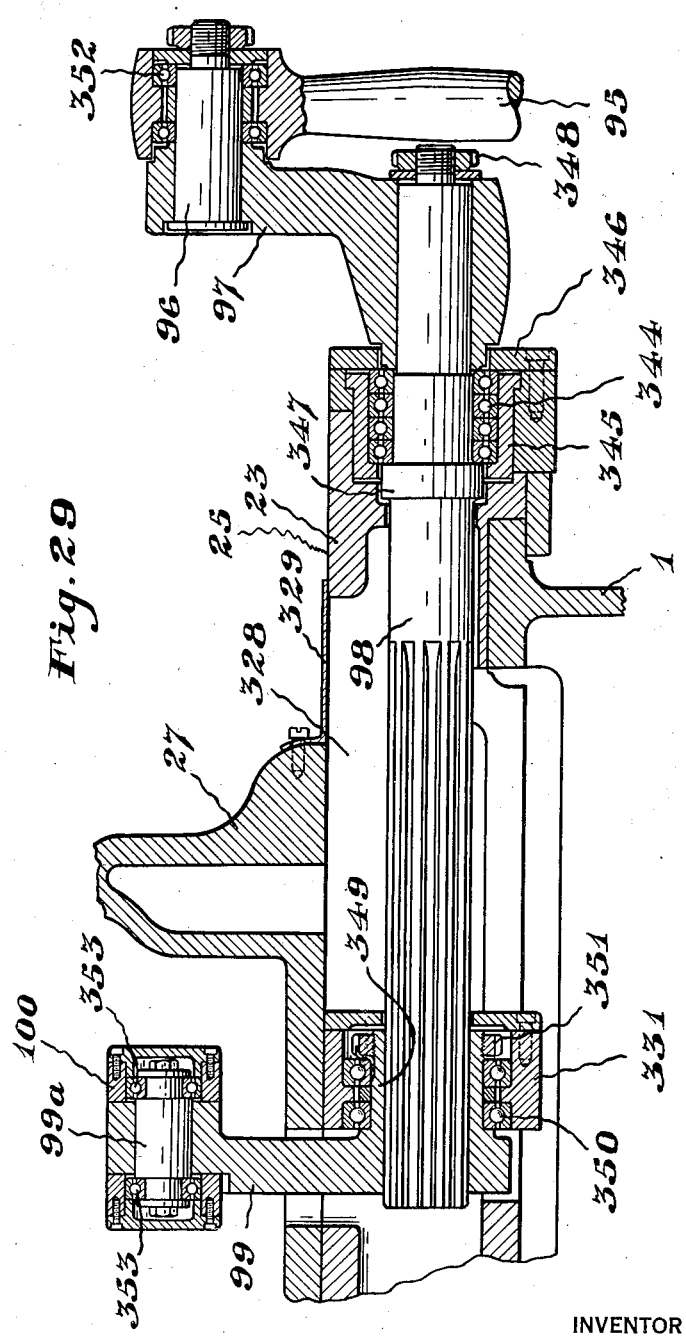

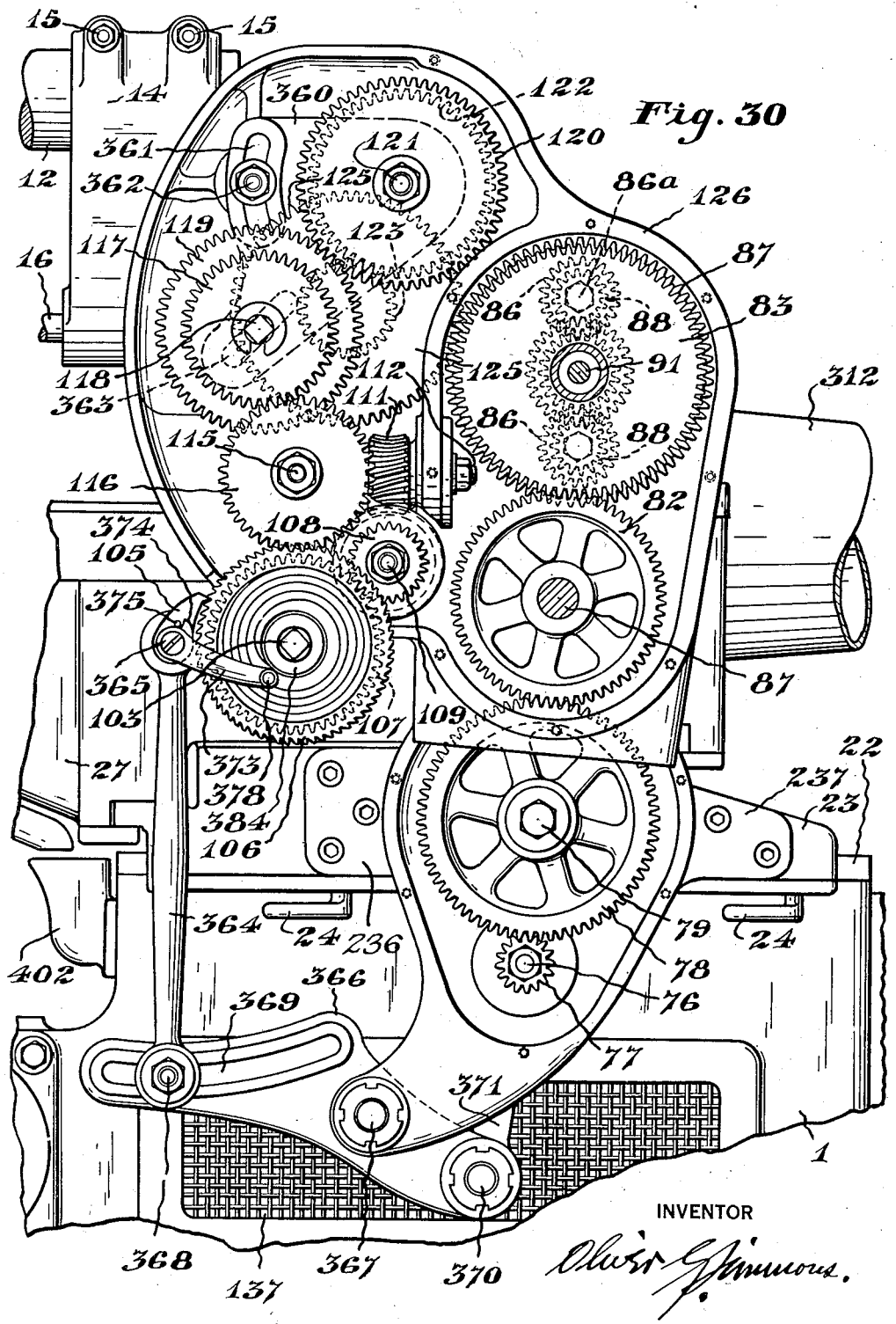

July 31, 1934.　　　　O. G. SIMMONS　　　　1,968,469
GEAR SHAPER
Filed April 10, 1930　　23 Sheets-Sheet 22
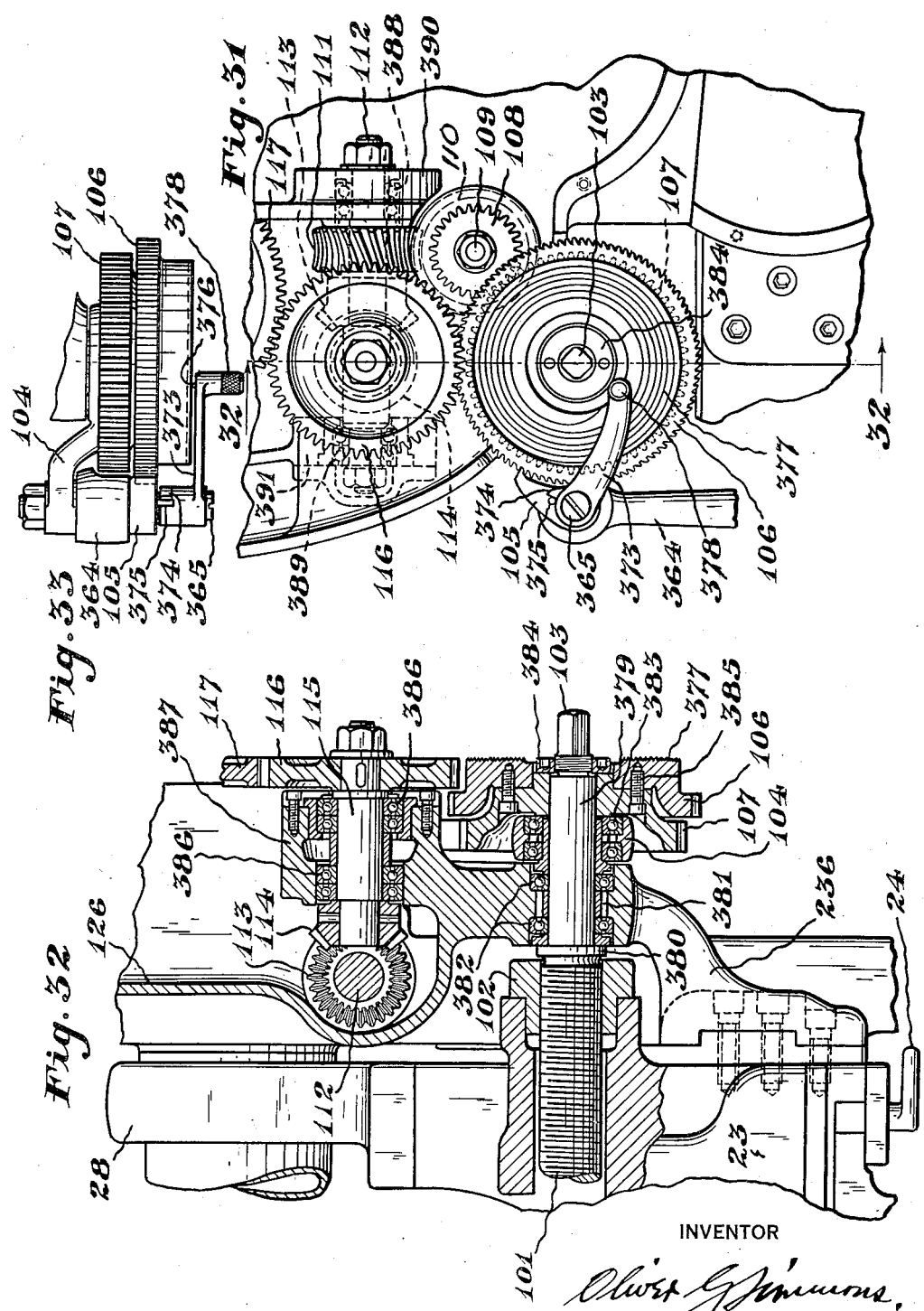
INVENTOR
Oliver G. Simmons July 31, 1934.    O. G. SIMMONS    1,968,469
GEAR SHAPER
Filed April 10, 1930    23 Sheets-Sheet 23

INVENTOR
Oliver G. Simmons.

Patented July 31, 1934

1,968,469

UNITED STATES PATENT OFFICE 1,968,469

GEAR SHAPER

Oliver G. Simmons, Lakewood, Ohio, assignor to M. Gloyd Simmons, Lakewood, Ohio

Application April 10, 1930, Serial No. 443,185

89 Claims. (Cl. 90—9)

This invention relates to gear generating machines and more particularly to generating machines of the type known as gear shapers in which the gear teeth are generated by means of a cutter which has a shape corresponding to that of a gear adapted to mesh with the gear being cut, the cutter being reciprocated in the direction of its axis across the face of a blank while the blank and cutter are rotated at the relative speeds of intermeshing gears corresponding to the cutter and the gear being generated.

The machine of the present invention is designed to generate straight tooth or helical gears by the method disclosed in my copending application Serial No. 178,021, filed March 24, 1927 patented June 24, 1930, No. 1,765,385 and reissued March 31, 1931, No. Re 18,021, by which method either spur or helical gears may be generated with standard straight tooth gear shaper cutters.

The gear generating machines most commonly used in the manufacture of spur and helical gears operate upon what is generally referred to in the text books as the "molding generating" principle. There are two distinct methods in common use, in one of which the molding element is the rack tooth conjugate to the gear being generated as diclosed in patent to Hugo Bilgram, No. 656,166, dated August 21, 1900 and in the other of which the molding element is a gear conjugate to the gear being generated as disclosed in patent to E. R. Fellows, No. 579,708, dated March 30, 1897. The first method may be termed the generating rack method and the second the generating gear method. In the first method, the generating element has an action on the blank which is considered to be equivalent to that of a rack on a cylinder of soft perfectly compressible material rolled over the rack without slippage with respect to the pitch line of the rack. In the second method, the generating element has an action on the blank which is considered to be the equivalent to that of a gear on a cylinder of soft compressible material rolled on the periphery of the gear without slippage with respect to the pitch circle of the gear.

Gear generating machines employing planing tools, commonly operate on the generating rack principle, while generating machines such as gear shapers employing gear shaper cutters intermeshing with the gear being generated, operate upon the generating gear principle.

The generating rack principle of operation is advantageous in that a single machine may be adapted for generating spur gears and helical gears of any helix angle by providing for relative angular adjustment between the blank and generating rack tooth element, but machines operating on this principle have the disadvantage of relatively slow operation due to the fact that the generating rack tooth cutting element engages only the adjacent faces in one space between teeth of the gear and indexing of the blank from tooth to tooth between relative reciprocation of the cutter and blank is necessary.

The generating gear principle of operation is advantageous in that the speed of operation is greater, both the gear blank and cutter being continuously rotated and all of the faces of the gear teeth being generated by the cutter while rotating in mesh with the gear being generated. Machines operating on this principle, however, have lacked the advantageous capability possessed by machines operating on the generating rack principle of being set for generation of gears of any desired helix angle. In machines employing a generating element in the form of a gear shaped cutter, it has heretofore been considered essential that the axes of the cutter and gear blank be disposed in a plane in parallel relation, since, if the cutter be disposed with its axis at an angle to the axis of the blank, the pitch cylinders of the cutter and gear being generated would be tangent at one point only, and the cutter would generate in the blank, on the molding generating principle, teeth which gradually decrease in depth from the point of tangency toward both ends of the teeth, the teeth of the cutter entering the blank to their full depth only at the point of tangency of the pitch cylinders. For this reason, gear shaper machines have heretofore required special single purpose helical guides and special single purpose helical cutters in the form of gears of the same helix angle as the gear to be cut, straight tooth cutters being employed only for cutting spur gears and a special helical cutter and a special helical guide being required for each helical gear of the given helical angle for each right hand helical gear and additional helical guides and helical cutters for each left hand gear.

The present invention has for its object to provide a gear generating machine employing a toothed rotary generating element of the intermeshing type which is so operated that, during its action on the gear blank, it is continuously generating the imaginary rack common to the cutter and the gear being generated and moving between the cutter and gear, and is at the same time rolling on the rack relatively to the gear being generated, so that, if the axis of the cutter be disposed at an angle to the axis of the gear, the relative rolling motion will cause the point of tangency of the pitch cylinders of the cutter and gear being generated to move across the blank, so that the cutter will generate a gear having teeth of uniform height from end to end and adapted to mesh with other gears generated by the same cutter. In other words, the present invention provides a generating machine having the advantage of the greater speed of operation possessed by machines operating on the generating gear principle and also the advantage possessed by machines operating on the generating rack principle of cutting gears of any helix angle with a single cutter by adjusting the cutter and blank to the proper angle, one with respect to the other. Thus, gears of all helix angles may be cut in the same machine with standard straight tooth gear shaper cutters.

My copending application above referred to discloses a method by which a uniform intermeshing relationship is maintained between the teeth of cutter and the teeth being cut in the gear blank during the feed of the cutter into the blank, this relationship being maintained by so controlling the rotary and feed movements of the cutter and blank, one with respect to the other, that both the cutter and the gear being generated are maintained in intermeshing relationship with an imaginary generating rack conjugate to both the cutter and gear and moving longitudinally between the cutter and gear during the generating operation.

The present invention has for an object to provide a universal gear shaper capable of generating gears of any given diameter and of any given helix angle within the limits of adjustment of the machine.

A further object is to provide a gear shaper in which the adjustments necessary for accommodating blanks of different widths and diameters and for generating teeth disposed at different helix angles may be quickly and easily made.

The present invention has for an object to provide, in a gear shaper, mechanism for correctly correlating the speeds of rotation of the cutter and blank and for varying the relative speeds of rotation during the feed movement to accurately compensate for the relative bodily movements of the cutter and blank as the cutter is fed into the blank to maintain the intermeshing relationship with respect to the imaginary generating rack.

A further object of the invention is to provide a gear shaper in which the cutter is fed tangentially across the face of the blank into and out of engagement therewith to completely generate the gear.

A further object of the invention is to provide, in a gear shaper, a movable spindle support, a feed mechanism for moving said support, a spindle driving mechanism and means by which the feed mechanism automatically controls the speed of rotation of the spindle.

A further object is to provide a universal gear shaper of compact and rugged construction in which the spindles are conveniently accessible for the mounting or removal of gear blanks and cutters and in which means is provided for quickly and accurately adjusting the spindle supports for gears of different widths and different helix angles.

A further object is to provide a gear shaper in which the method of generation is such that accurate centering of the gear blank with respect to the cutter axis is not required.

A further object is to provide a universal gear shaper in which the spindle driving mechanisms, feeding mechanism and cutter reciprocating mechanism are driven from a common source of power and in which the ratio of spindle speeds may be readily changed to obtain the correct relative speeds between the cutter and work spindles.

A further object is to provide a gear shaper which has a spindle driving mechanism including a differential planetary gearing device provided with driving connections with two separate actuating elements, one of which is a feed mechanism, whereby the speed of rotation of the spindle is automatically controlled by the feed mechanism.

A further object is to provide a support for the reciprocating cutter spindle which is adjustable in the direction of the spindle axis to adjust the reciprocating spindle with respect to the work, and further, to provide means for reciprocating the cutter in its various positions of adjustment, and, in addition, to provide means for varying the length of stroke of the cutter in any of its adjusted positions.

A further object is to provide a cutter spindle mounted for feed movement in a direction tangentially with respect to the gear blank, together with means for reciprocating the cutter and for holding the cutter in blank engaging position during its forward stroke and out of blank engaging position during its return stroke, the cutter reciprocating mechanism being operable during the transverse feed movement of the spindle.

A further object is to provide a spindle support mounted for reciprocation in the direction of the axis of the spindle and for oscillation about an axis at right angles to the spindle to disengage the cutter from the blank during the return stroke of the spindle, and further, to provide means for continuously driving the spindle during its reciprocating and oscillatory movements.

A further object of the invention is to provide a universal gear shaper with a cutting generating action which is the resultant of combining together two separate and distinct generating actions, the generating component of each generating action being defined, one as an intermeshing rotary movement between the cutting element and blank and the other being that of an intermeshing rotary movement of the blank with a tangential movement of the intermeshing rotating cutting element.

A further object is to provide a generating cutting action in a universal gear shaper so that the circumferential series of teeth in the blank will all be roughed out to substantially the desired form of tooth and thus all of the circumferential series of teeth in the blank will begin to finish substantially simultaneously.

A further object of the invention is to provide a universal gear shaper with an adjustable tangential feed mechanism, which mechanism also includes automatic means whereby the feed may be automatically disengaged at any desired point in the tangential movement.

With the above and other objects in view, the invention may be said to comprise the machine as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Fig. 4 is a left end elevation of the machine, the end observed being that end at the left hand side of the observer and therefore looking toward the end upon which the work spindle is mounted.

Fig. 5 is a right end elevation of the machine, the end observed being that end at the right hand side of the observer and therefore looking toward the end upon which the cutter spindle is mounted.

Fig. 6 is a top plan view of the machine.

Fig. 13 is a diagrammatic plan view showing the driving mechanism for all moving parts of the machine, the various gearings being more or less arbitrarily positioned for convenience of illustration without reference to the exact position thereof in the machine.

Fig. 13a is a fragmentary end elevation of the gearing shown in Fig. 13 looking from the left hand side of said figure.

Fig. 16 is a vertical section through the work spindle supporting turret taken on the line indicated at 16—16 in Fig. 2 looking in the direction of the arrows.

Fig. 17 is a fragmentary vertical section through the work spindle supporting turret taken on the line indicated at 17—17 in Fig. 16 looking in the direction of the arrows.

Fig. 18 is a fragmentary transverse vertical section through the work spindle supporting head taken on the line indicated at 18—18 in Fig. 4 looking in the direction of the arrows.

Fig. 19 is a transverse vertical section taken on the line indicated at 19—19 in Fig. 2 looking in the direction of the arrows.

Figure 22:
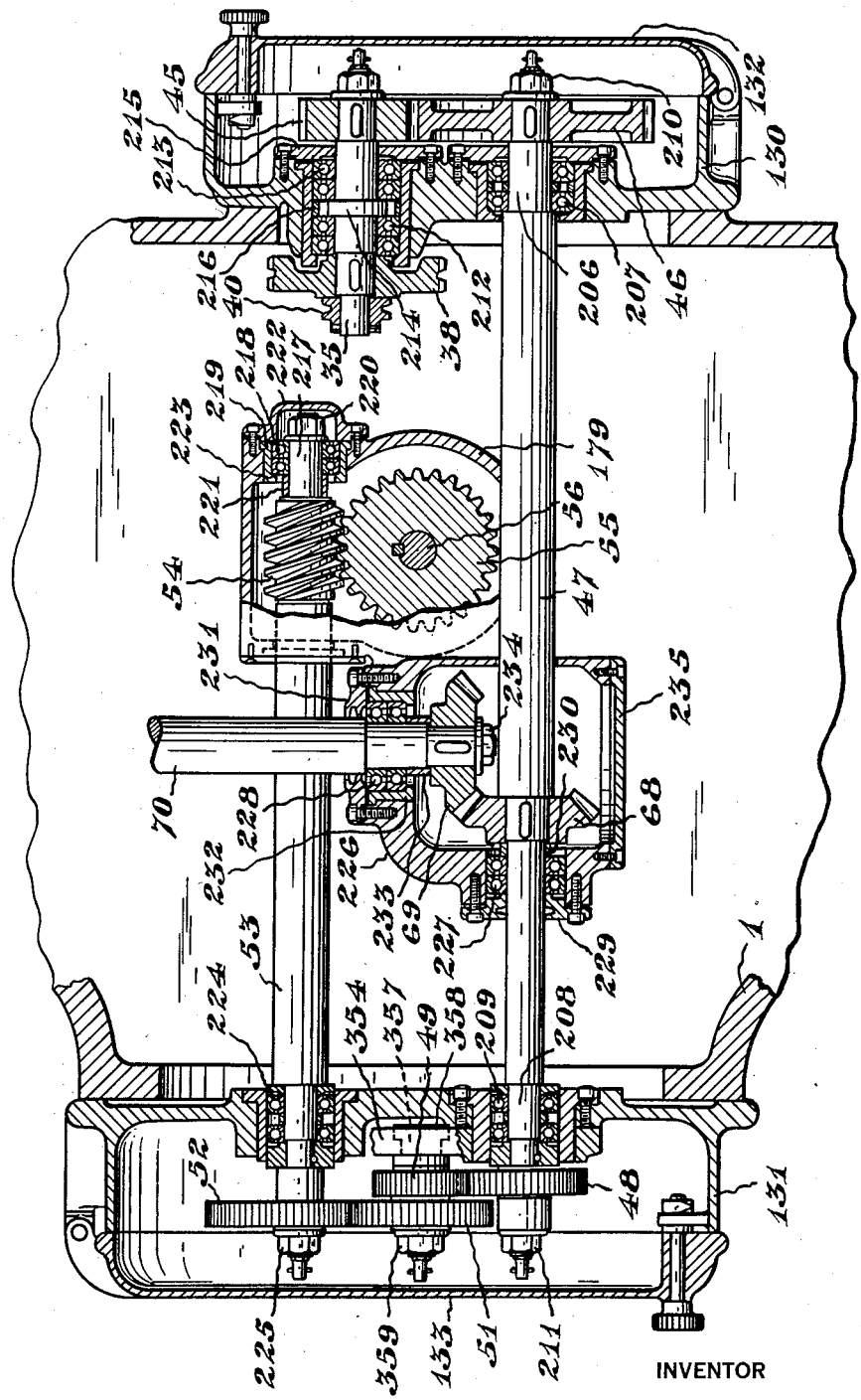

Fig. 22 is a fragmentary horizontal section through the base of the machine beneath the work spindle turret showing the mechanism for driving the longitudinal shaft through which the cutter spindle is driven and the vertical shaft coaxial with the turret through which the work spindle is driven, the section being taken on the line indicated at 22—22 in Fig. 4 looking in the direction of the arrows.

Figure 3:
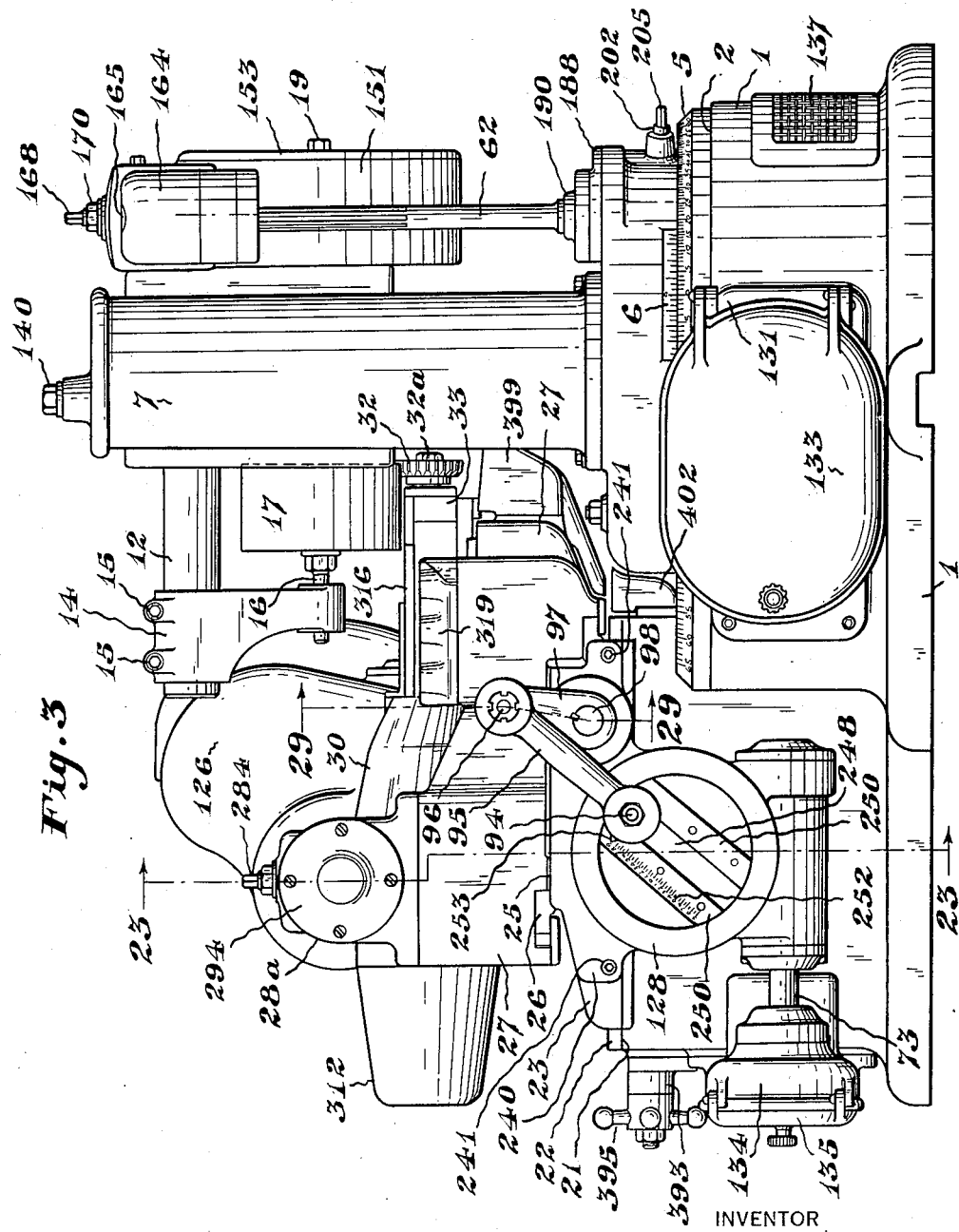
Fig. 3 is a rear side elevation of the machine looking toward the side opposite that shown in Fig. 2.
Figure 23:
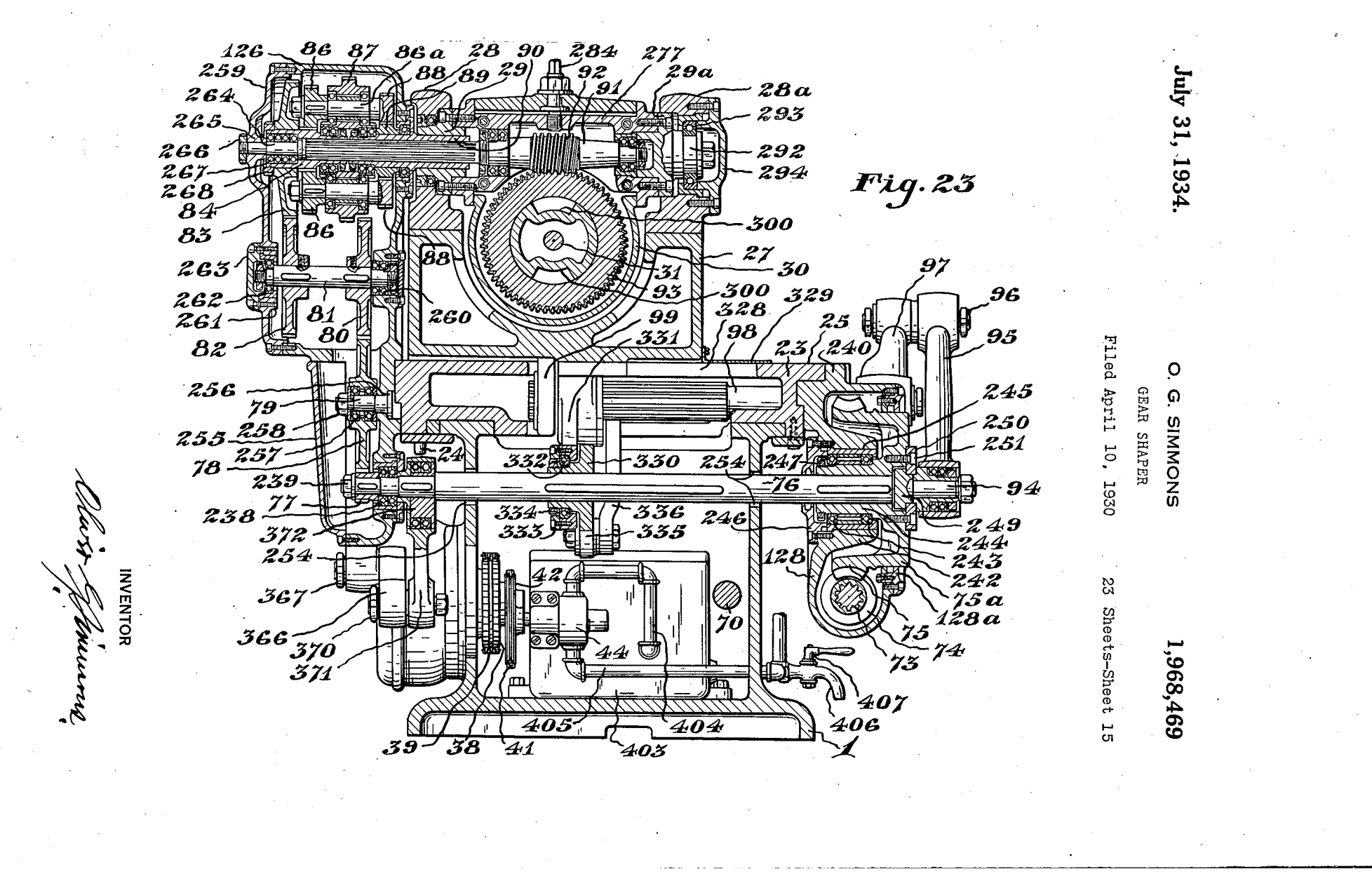

Fig. 23 is a vertical section taken on the line indicated at 23—23 in Fig. 3 looking in the direction of the arrows, showing the mechanism for driving the cutter spindle.

Figure 24:
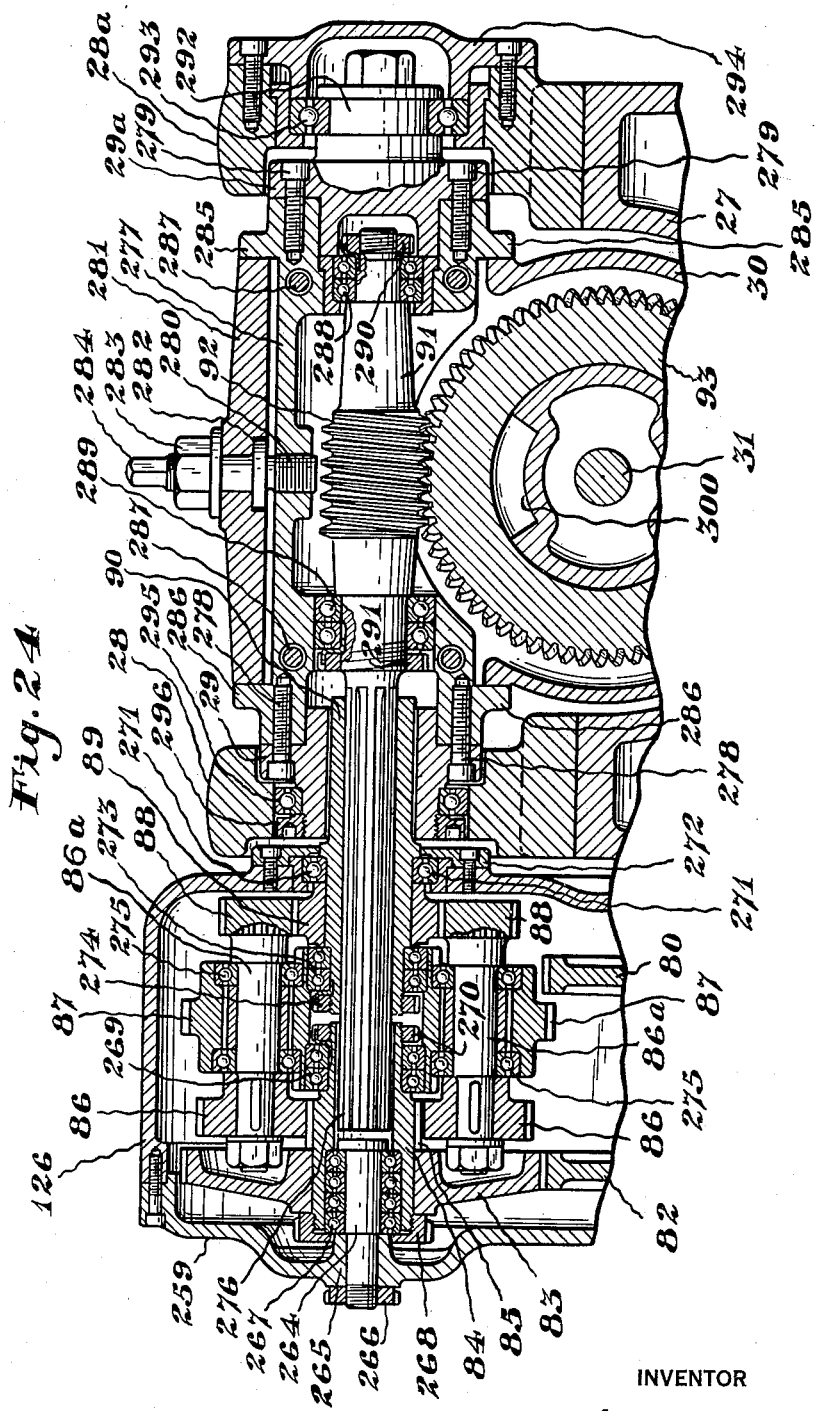

Fig. 24 is a fragmentary section corresponding to Fig. 23 and showing on an enlarged scale the spindle supporting head, the transverse spindle drive shaft and the planetary gearing through which the shaft is driven.

Figure 1:
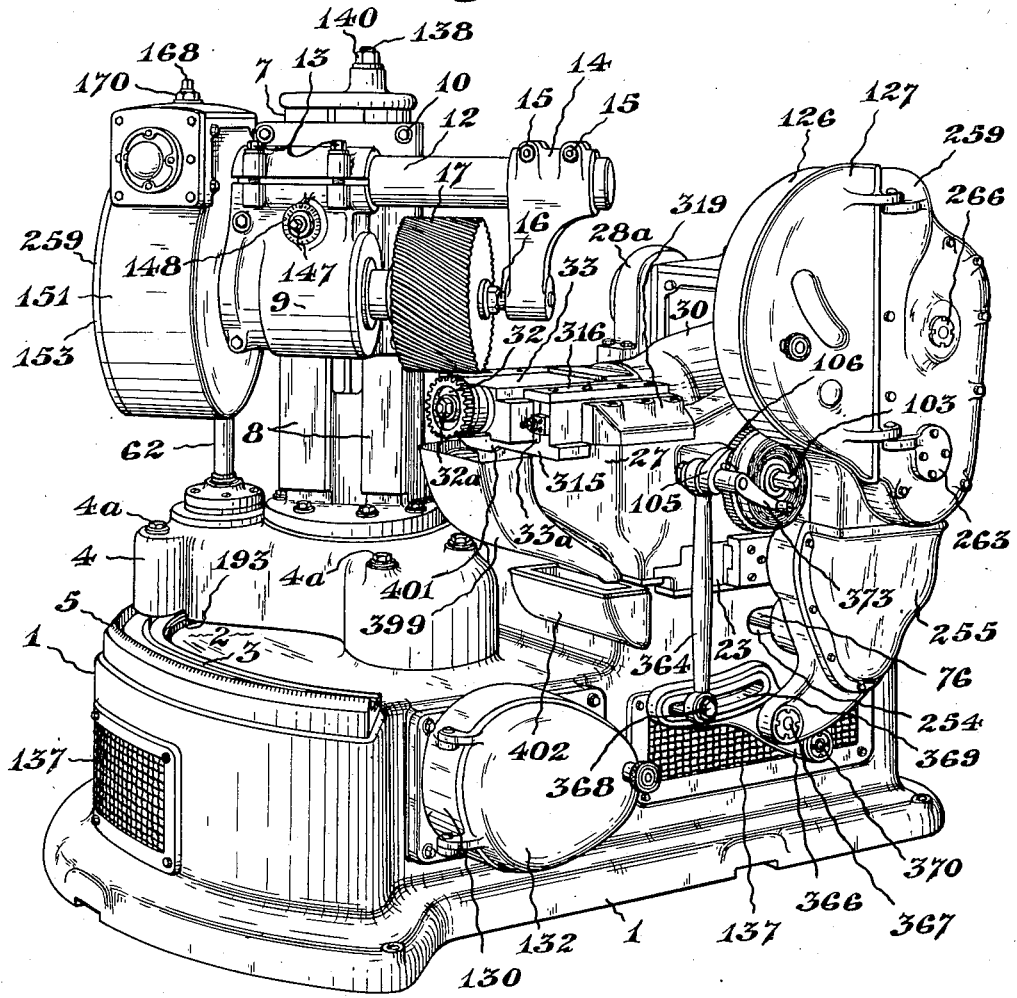
Figure 1 is a perspective view of the machine embodying the present invention.
Figure 2:
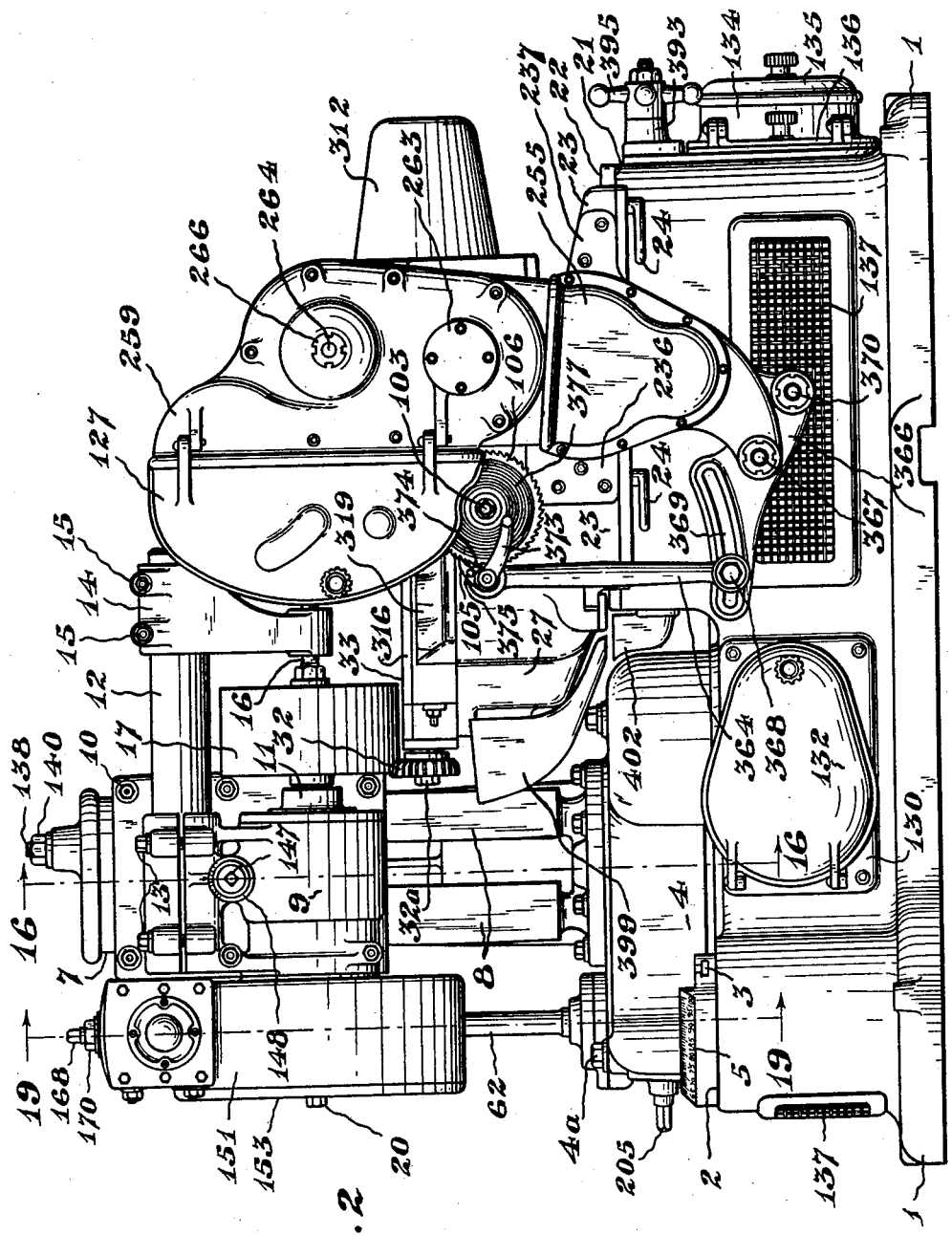
Fig. 2 is a front side elevation of the machine looking toward the side from which the work and cutter spindles are accessible for the attachment of gear blank to the work spindle and removal of finished gears therefrom, and for the removal and replacement of cutters.
Figure 25:
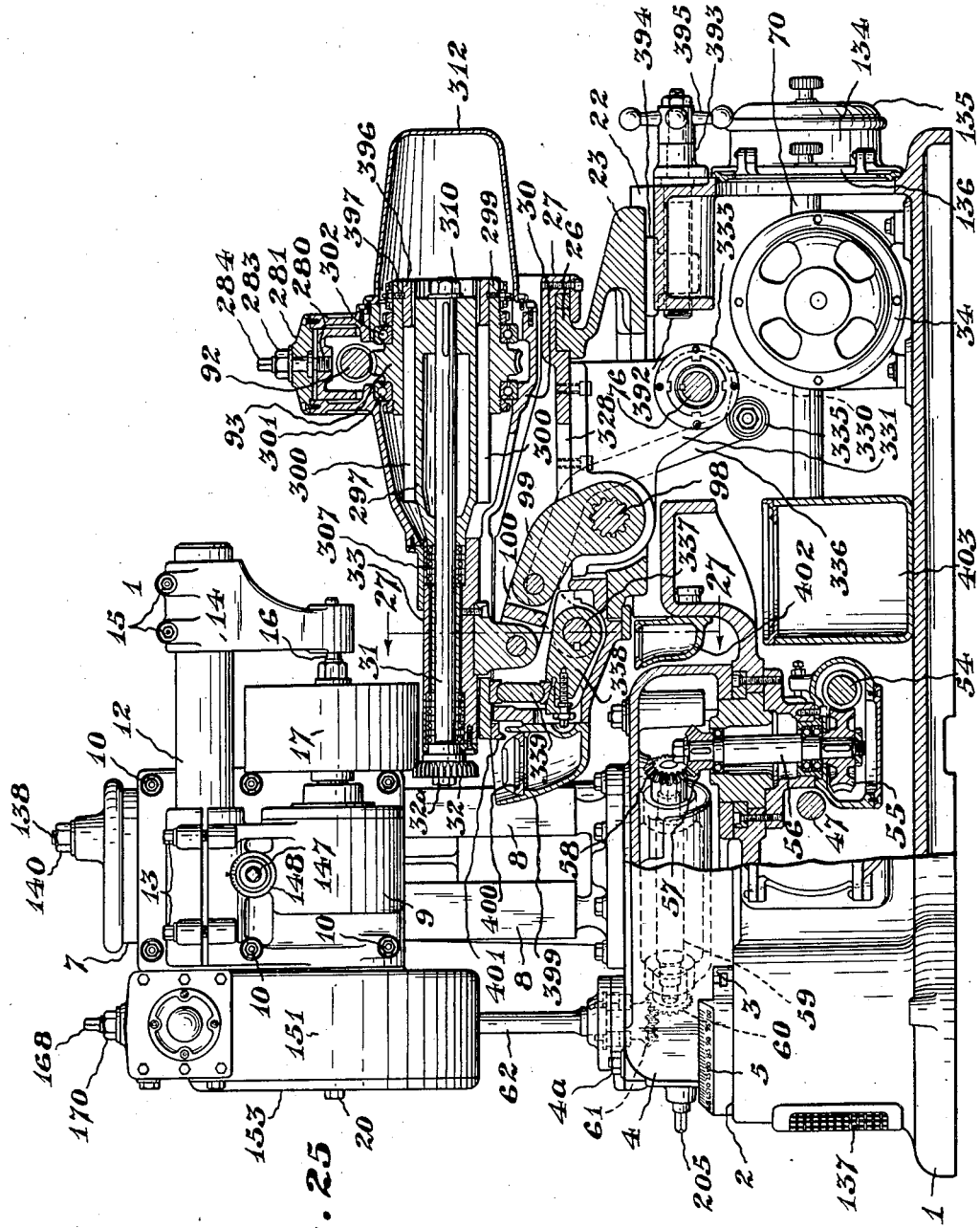

Fig. 25 is a sectional elevation showing the end of the machine on which the work spindle turret is mounted in side elevation as in Fig. 2 and the remainder of the machine in a longitudinal vertical section taken axially of the cutter spindle supporting head on the line indicated at 25—25 in Fig. 6 and looking in the direction of the arrows.

Figure 26:
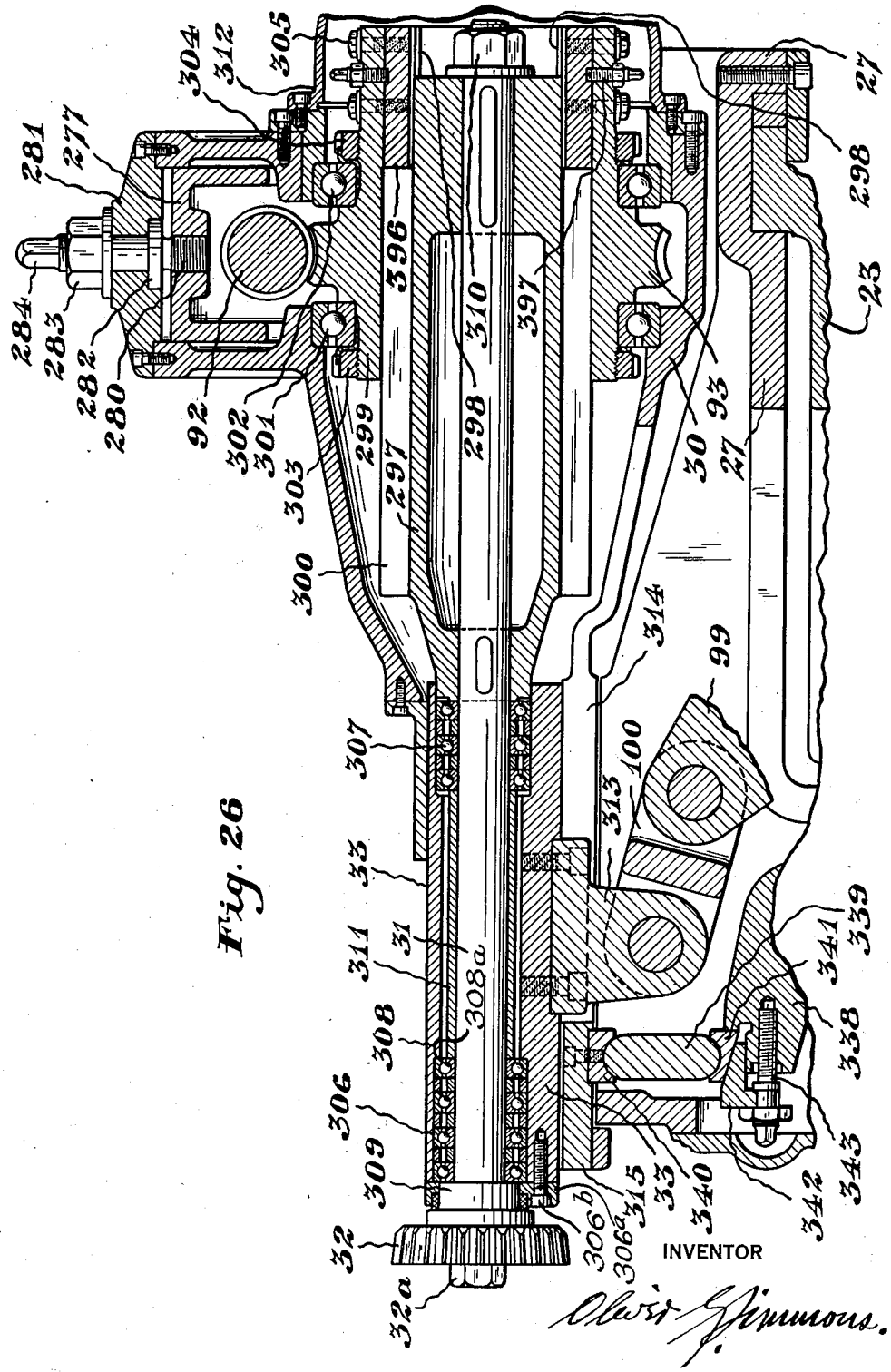

Fig. 26 is a fragmentary longitudinal axial section on an enlarged scale but corresponding to a portion of Fig. 25 and being taken through the pivotally mounted head and the longitudinally movable slide in which the cutter spindle is mounted.

Figure 27:
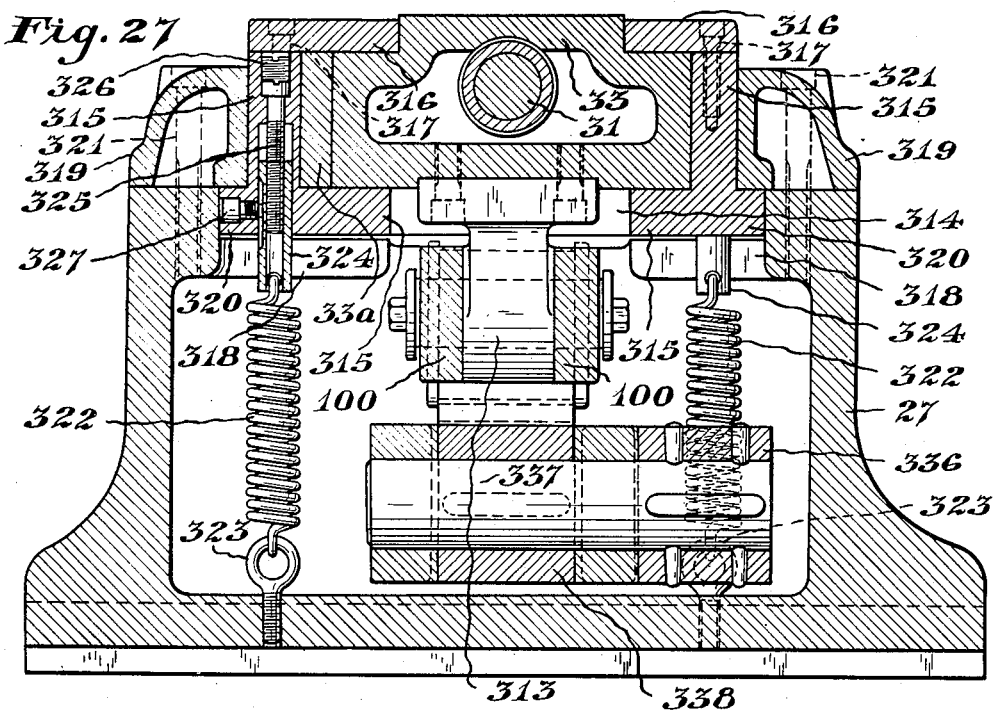

Fig. 27 is a transverse vertical section taken on the line indicated at 27—27 in Fig. 25 and looking in the direction of the arrows.

Figure 28:
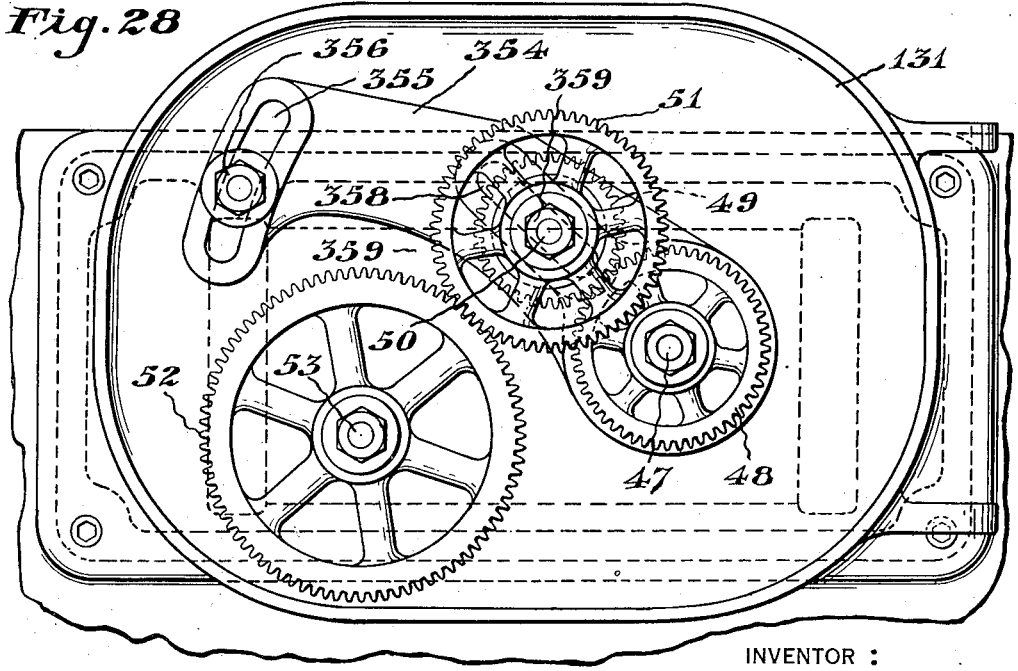

Fig. 28 is a side elevation of the change gears for varying the speed ratio between the work spindle and cutter spindle.

Fig. 29 is a fragmentary vertical section taken on the line indicated at 29—29 in Fig. 3 and looking in the direction of the arrows.

Fig. 30 is a side elevation of gear trains through which the cutter spindle is driven at speeds correlated to the speed of rotation of the work spindle and to the rate of lateral feed movement.

Fig. 31 is a fragmentary side elevation of a portion of the gear train interposed between the cutter spindle and its feed mechanism.

Fig. 32 is a section taken on the line indicated at 32—32 in Fig. 31 and looking in the direction of the arrows.

Fig. 33 is a fragmentary top plan view of the ratchet and pawl mechanism shown in Figs. 30, 31 and 32.

Figure 34:
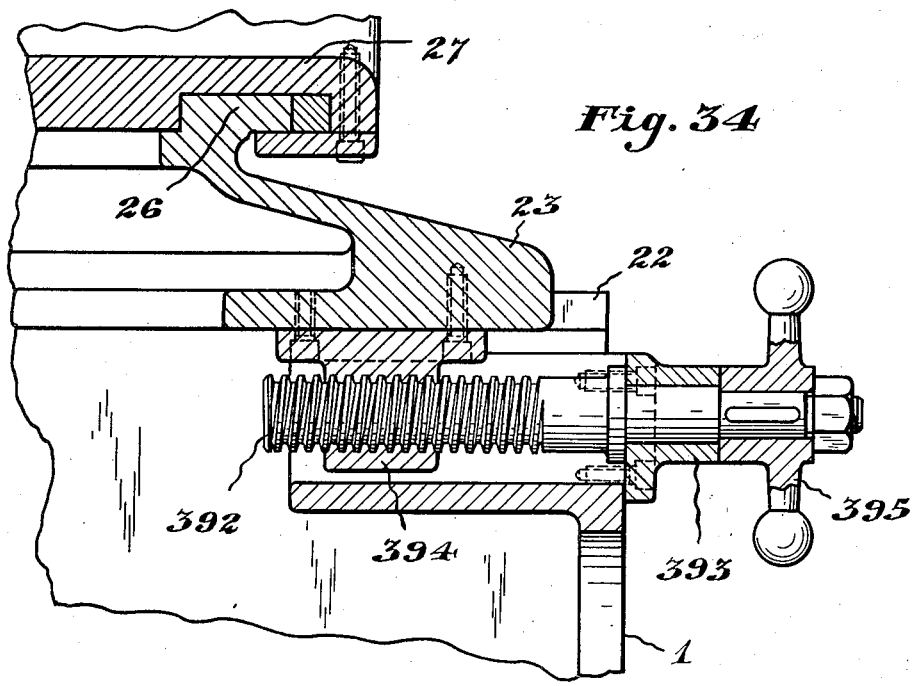

Fig. 34 is a fragmentary vertical section taken on the line indicated at 34—34 in Fig. 5 looking in the direction of the arrows.

Figure 35:
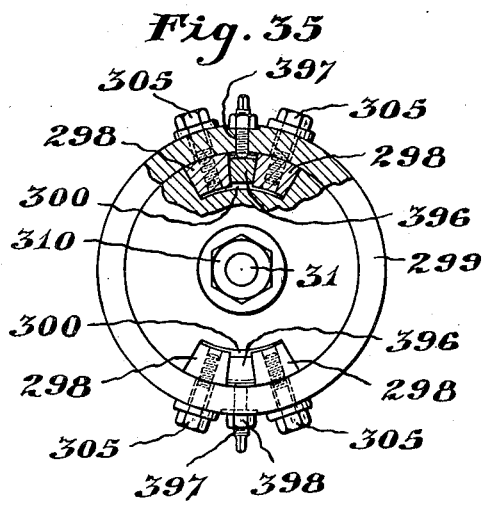

Fig. 35 is a detail view showing in end elevation the supporting sleeve at the rear end of the cutter spindle and the hub in which it is splined, the portion of the hub and sleeve being broken away to show the gibs in section.

Figure 36:
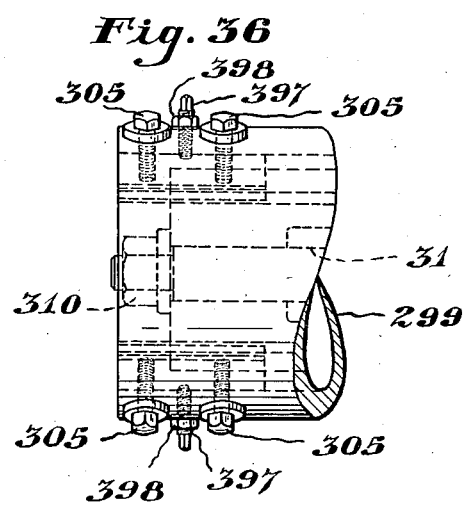

Fig. 36 is a fragmentary side elevation of the rear end of the sleeve supporting hub shown in Fig. 35.

Referring to the accompanying drawings, the machine of the present invention is mounted upon a suitable hollow base 1, preferably in the form of a casting which serves as a housing for the driving motor and a portion of the driving mechanism. At the left end thereof and intermediate the sides, the base 1 is provided with a turret supporting bed 2, which is provided with an arcuate way 3, for adjustably supporting a turret base 4, which is mounted on the way 3 for adjustment angularly about a fixed vertical axis and which may be rigidly secured in any desired position of angular adjustment by means of clamping bolts 4a. Outwardly of the way 3, the base is provided with an arcuate flange having a beveled upper edge 5 which is graduated in degrees and which co-operates with a vernier scale 6 on the base 4 to accurately indicate the angular adjustment of the turret. The turret is provided laterally of its axis with a standard 7, provided on its inner face with a vertical way 8, in which a spindle carrying head 9 is mounted for vertical adjustment, the head 9 being provided with clamping bolts 10 by which it may be rigidly secured in different positions of vertical adjustment on the standard 7. The head 9 has journaled therein a horizontal work spindle 11 and has fixed thereto above the spindle and parallel therewith, a supporting bar 12 which projects beyond the inner end of the spindle. The supporting bar 12 is held in place on the head 9 by clamping bolts 13 and provides a support for a tail stock 14 which is slidably mounted on the supporting bar and adapted to be rigidly secured in adjusted position thereon by means of clamping bolts 15. The tail stock 14 provides a bearing for the outer end of an arbor 16, to which a gear blank 17 may be secured. As shown in Fig. 13, the arbor 16 has a conical inner end which fits in a conical recess 18 at one end of the work spindle 11 which is of tubular form, the arbor being provided with an internally threaded end which receives the threaded end of a draw bolt 19 which serves to clamp the arbor in the recess 18 in engagement with driving lugs 20 on the end of the spindle. By adjusting the turret on the bed 2, the work spindle 11 may be disposed at any desired angle with respect to the longitudinal center line of the machine and by adjusting the head 9 vertically on the standard 7, the work spindle may be adjusted to any desired height above the base 4, the vertical adjustment of the work spindle enabling the work spindle to be properly positioned for gear blanks of different diameters and the angular adjustment of the work spindle, permitting the same to be adjusted for generating the gears of any desired helix angle.

At the right end thereof, the base 1 is provided with a horizontal bed 21 which is provided with longitudinal ways 22, which serve as guides for a longitudinally adjustable support 23 which is adapted to be rigidly secured in adjusted positions by means of clamping members 24, the support 23 is provided on the top thereof with a horizontal bed 25, provided with transverse ways 26, which serve as guides for a transversely movable carriage 27. The carriage 27 is provided adjacent the rear end thereof with laterally alined trunnion bearings 28 and 28a, which receive horizontally disposed trunnions 29 and 29a carried by a head 30, which provides a rocking support for a cutter spindle 31, to the left end of which may be secured a gear shaped cutter 32 for engagement with the gear blank 17. The left end of the cutter spindle 31 is journaled and held against longitudinal movement in a slide 33 which is guided for longitudinal movement in the head 30.

The cutter spindle 31 is thus mounted for axial reciprocation on the carriage 27, for transverse movement bodily with the carriage 27, and for vertical rocking movement during its operation. The cutting stroke of the cutter spindle and the lateral movement of the cutter spindle are in a horizontal plane fixed with respect to the base of the machine, so that for cutting different sized gears, vertical adjustments of the work spindle head 9 may properly position the gear blanks with respect to the cutter.

*Principle of operation*

Figure 7:
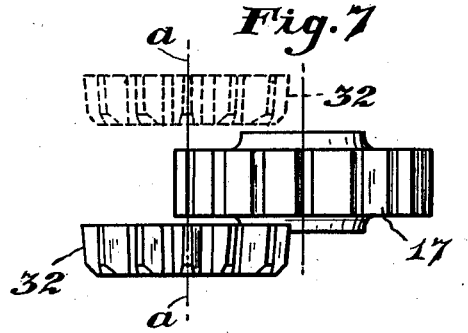
Fig. 7 is a diagrammatic view showing a cutter and blank at the beginning of the operation for generating a spur gear, the cutter being shown in full lines in retracted position and in dotted lines at the forward end of its stroke.

The machine of the present invention is designed to operate upon a principle which is illustrated in Figs. 7 to 12 of the drawings. During the operation of the machine, the cutter spindle is reciprocated axially, while the spindle supporting carriage 27 is fed transversely of the machine. The position of the cutter axis with respect to the blank at the beginning of the gear generating operation is shown in Fig. 7 of the drawings, where the cutter 32 is shown, being reciprocated axially along a line a—a to the left of the axis of the gear blank 17. During the transverse feed of the cutter spindle occasioned by the movement of carriage 27, the cutter is gradually moved transversely across the face of the gear blank to the position shown at b—b in Fig. 8 to the right of the axis of the gear blank. In moving across the face of the gear blank 17, the cutter starts from the position shown in dotted lines at the left in Fig. 9, and, moving tangentially of the gear blank, cuts deeper and deeper into the gear blank until the cutter is brought to a position in which its pitch cylinder is tangent to the pitch cylinder of the blank, where the teeth of the cutter engage the teeth of the blank to their full depth. Further lateral movement of the cutter causes the cutter to gradually recede from the axis of the blank until out of engagement with the blank. During the lateral feed of the cutter, the speeds of rotation of the cutter and blank are so correlated that both the cutter and gear being generated maintain intermeshing relationship with the imaginary generating rack r, shown in Fig. 9, the cutter being in the form of a gear conjugate to the rack r which is the rack of the gear being generated. There is a predetermined fixed ratio between the speed of rotation of the cutter and the speed of rotation of the gear when the two are driven in mesh with each other such that the cutter and gear are maintained in mesh with each other and with the imaginary rack "r" moving between the cutter and gear. In order to maintain a uniform generating relationship between the cutter and the gear being generated during the feed of the cutter into the blank, it is desirable that the cutter and gear blank be driven at speeds so correlated that intermeshing relationship is maintained between both the cutter and gear and the imaginary generating rack "r" and, during the tangential feed movement of the cutter, the speed of rotation of one of the spindles must be varied by an amount proportional to the speed of tangential feed movement in order to maintain the intermeshing relationship of the cutter and gear with the imaginary generating rack "r". As will be hereinafter more fully explained, the machine of the present invention is provided with means for driving the cutter and work spindles at various speed ratios, for reciprocating the cutter spindle axially, for feeding the spindle supporting carriage 27 transversely to move the cutter spindle from the position a—a shown in Fig. 7 to the position b—b shown in Fig. 8; and means is also provided for automatically varying the speed of rotation of one of the spindles to maintain the uniform generating relationship between the cutter and gear being generated.

Figure 10:
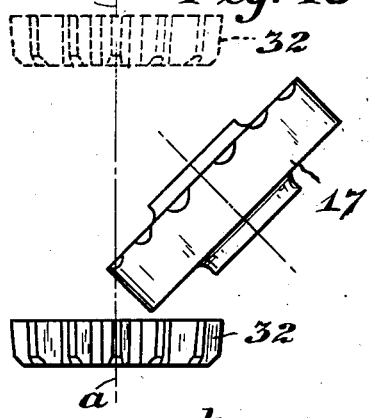
Fig. 10 is a diagrammatic view similar to Fig. 7 showing the position of the cutter with respect to a blank at the beginning of the operation for generating a helical gear.
Figure 11:
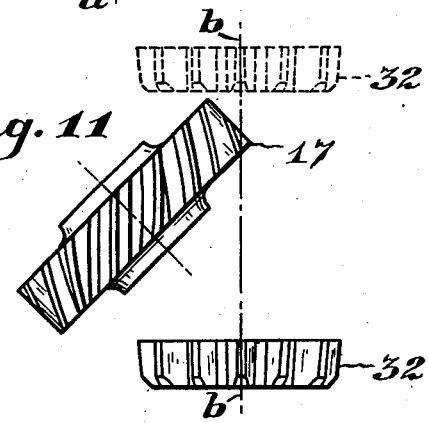
Fig. 11 is a view similar to Fig. 8 showing the relative positions of the cutter and helical gear which has been cut at the completion of the cutting operation.
Figure 8:
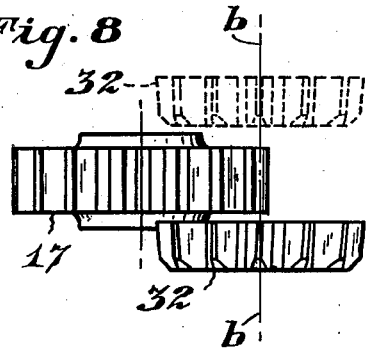
Fig. 8 shows the position of the cutter with respect to the spur gear at the completion of the cutting operation.
Figure 12:
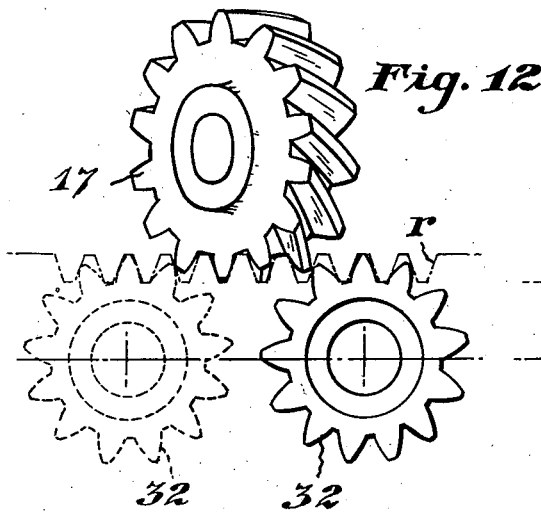
Fig. 12 is a diagrammatic view showing the movements of the cutter with respect to a blank in generating a helical gear and with respect to the rack of the gear, the cutter being shown in full lines in the position which it occupies at the end of the generating operation and in dotted lines in the position which it occupies at the beginning of the generating operation.
Figure 9:
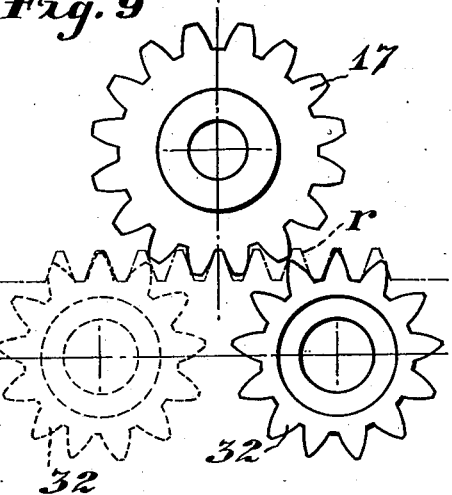
Fig. 9 is a diagrammatic view illustrating the movements of the cutter with respect to the blank and with respect to the imaginary generating rack, the cutter being shown in full lines in the position which it occupies at the end of the generating operation, and in dotted lines in the position which it occupies at the beginning of the generating operation.
Figure 14:
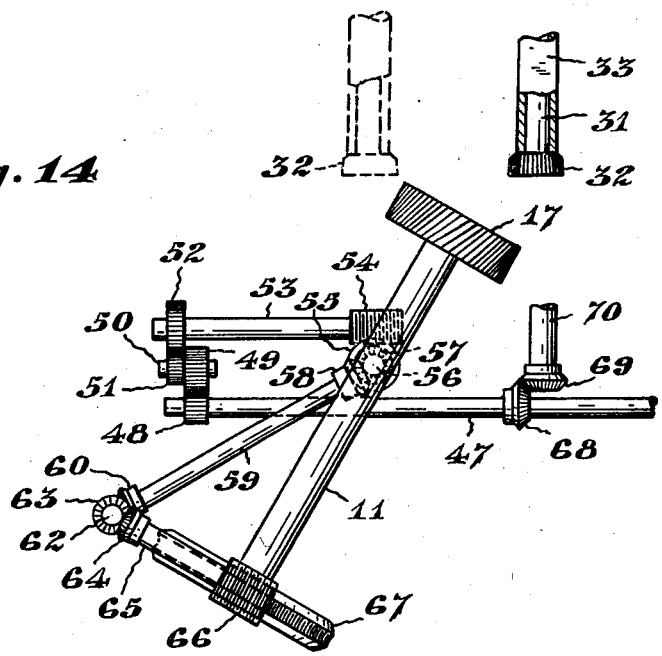
Fig. 14 is a diagrammatic plan view showing the work spindle and its driving mechanism, the spindle being adjusted to an angle with respect to the cutter spindle for generating a helical gear.
Figure 15:
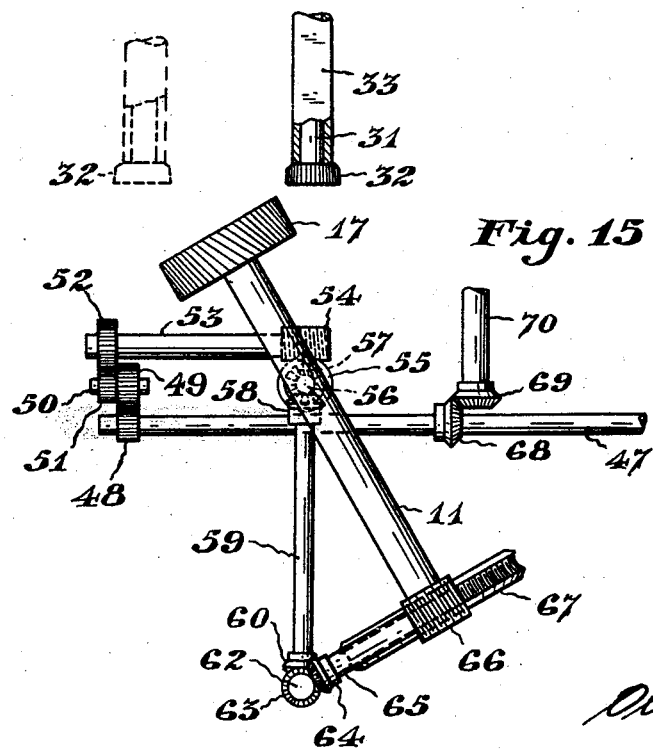
Fig. 15 is a diagrammatic plan view of the work spindle and driving mechanism shown in Fig. 14 with the work spindle disposed at an angle to the cutter spindle opposite that shown in Fig. 14 for generating a helical gear of the opposite hand.

Figs. 10, 11 and 12 show the operating cycle in the generation of a helical gear. The blank 17 in this instance is disposed at an angle to the cutter axis corresponding to the helix angle of the gear to be cut. The tangential movement of the cutter is precisely the same in the generation of helical gears as in the generation of spur gears, and a uniform generating relationship is maintained between the cutter and gear being generated by maintaining the cutter and gear in mesh with the imaginary generating rack "r".

In the generation of spur gears with a straight tooth cutter as heretofore practiced, the axes of the cutter and work spindles are parallel and, when the cutter spindle is brought into full intermeshed relation with the work, the pitch cylinders of the cutter and gear being generated are tangent to each other along a line extending across the gear blank and the cutter teeth engage the teeth of the gear to their full depth throughout the length of the gear teeth. In the generation of helical gears as previously practiced, however, the line of tangency of the pitch cylinders of the cutter and gear are at an angle to each other and the cutter teeth can engage the gear teeth to their full depth only at the point of tangency. In the machine of the present invention, the axes of the cutter and work spindle are disposed angularly in parallel planes and therefore the cutter in generating helical gears has a rolling movement transversely of the gear blank on the imaginary generating rack, so that the line of tangency of the pitch cylinder of the cutter with the common tangent plane crosses the line of tangency of the pitch cylinder of the gear, first at one end and then gradually traverses the entire length of said line of tangency, so that during the feed movement of the cutter, the cutter teeth are caused to engage the gear teeth to their full depth from end to end so that gear teeth of uniform depth from end to end are generated.

The generation of either spur or helical gears by the above described method has the important advantage that the cutter teeth are inherently accurately centered with respect to the teeth of the gear being generated during the entire operation and have a uniform cutting action gradually widening and deepening the grooves in the blank until helical teeth of the gear are completely generated, the gear being completely generated during the transverse feed of the cutter. In the machine of the present invention, the cutter and work spindles are rotated at speeds which are relatively high as compared to the speeds of rotation in gear shapers heretofore used, so that during the relatively slow tangential feed movement, the cutter has uniform generating action throughout the circumference of the gear blank.

In cutting helical gears, there is the further advantage that a standard straight tooth cutter may be employed for cutting gears of any helix angle by simply adjusting the axis of the work spindle at an angle to the axis of the cutter spindle corresponding to the helix angle of the gear to be cut since the axis of the cutter and the axis of the gear to be cut are disposed in different parallel planes. In gear shaper cutters as heretofore designed, it has always been necessary to employ a cutter in the form of a helical gear and a helical guide for the machine, each having a helix angle identical with the gear being cut and to operate the cutter on an axis parallel and lying in the same plane as with the axis of the gear being cut in order to obtain a full depth cut throughout the length of the blank.

Driving mechanism

The mechanism for driving the work spindle and cutter spindle in their various positions of adjustment, for reciprocating axially the cutter spindle, for feeding the cutter spindle carriage laterally, and for simultaneously varying the speed of rotation of the cutter spindle is shown diagrammatically in Fig. 13 of the drawings.

The entire mechanism is driven by an electric motor 34, which is mounted within the base 1 adjacent the right side of the machine and which drives a short transverse shaft 35 mounted in the base adjacent the forward end of the machine through a silent chain drive which comprises a sprocket 36 on the motor shaft 37, a sprocket 38 fixed to the shaft 35 and a drive chain 39 extending over the sprockets 36 and 38. The shaft 35 also carries a grooved pulley 40 which drives a belt 41 extending over a pulley 42 fixed to the shaft 43 of an oil pump 44, which may be of any suitable design for delivering a lubricating liquid to the blank and cutter during the cutting operation. The shaft 35 is mounted in the front side wall of the base 1 and has fixed thereto, outside the wall, a change speed spur gear 45 which meshes with a change speed spur gear 46 fixed to a transverse shaft 47, which extends transversely across the base 1 from the front side wall thereof to the rear side wall. Outside the rear side wall of the base 1, the shaft 47 has fixed thereto an index spur gear 48 which meshes with an index spur gear 49 on an adjustable counter shaft 50 which has fixed thereto a second index spur gear 51 meshing with an index spur gear 52 on a transverse shaft 53 (see Figs. 13 and 22). The shaft 53 has fixed to the other end thereof a worm 54 which meshes with a worm gear 55 fixed to a vertical shaft 56 (see Fig. 20), which is located at the axis of the work spindle carrying turret 4. The vertical shaft 56 is mounted on the base of the machine and has fixed thereto a miter gear 57 which meshes with a miter gear 58 fixed to a horizontal shaft 59 mounted in the base 4 of the turret. The shaft 59 has a miter gear 60 fixed to the outer end thereof which meshes with a miter gear 61 fixed to the lower end of a vertical shaft 62 extending upwardly from the base of the turret alongside the standard 7 (see Figs. 13, 14, 15, 19 and 20). At the upper end thereof, the shaft 62 has splined thereto a miter gear 63 which is carried by a part of the work spindle carrying head 9. The gear 63 meshes with a miter gear 64 fixed to the end of a horizontal worm shaft 65 mounted in the head 9 and extending across the head at right angles to the work spindle 11. The shaft 65 has fixed thereto a worm 66 which meshes with a worm wheel 67 fixed to the work spindle 11 (see Figs. 13, 14, 15, 18 and 19). The gearing above described provides a driving connection from the motor 34 to the work spindle 11 in any adjusted position of the spindle. The vertical shaft 56 at the axis of the turret 4 providing a drive through the shafts 59, 62 and 65 to the work spindle in any angular adjustment of the turret and the spline shaft 62 providing a drive through the splined gear 63 to the worm shaft 65 in any vertical position of the spindle carrying head 9. The gears 45 and 46 are accessible from the front of the machine and the gears 48, 49, 51 and 52 are accessible from the rear of the machine (see Fig. 28). All of these gears are change gears, being readily detachable and replaceable with gears of different sizes to obtain various speed ratios, as well understood in the art.

Intermediate the ends thereof, the transverse shaft 47 has fixed thereto a miter gear 68 which meshes with a miter gear 69 fixed to the forward end of a longitudinal shaft 70 which projects through the right side wall of the housing 1 and has fixed thereto outside the wall, a spur gear 71 which meshes with a spur gear 72 fixed to a telescopic shaft 73 (see Figs. 13, 22, 23 and 25). The gears 71 and 72 are accessible from the right side of the machine. One end of the telescopic shaft 73 is mounted in the longitudinally adjustable support 23 and has fixed thereto a worm 74 which meshes with a worm wheel 75 fixed to a transverse shaft 76 also mounted on the support 23 (see Figs. 13, 23, and 30). The shaft 76 has fixed thereto a cutter speed change gear 77 which meshes with a cutter speed change gear 78 mounted on a short counter shaft 79. The gear 78 meshes with a gear 80 on a transverse shaft 81 mounted on the support 23. The shaft 81 has fixed thereto a second gear 82 which meshes with a gear 83 fixed to a transverse shaft 84. The shaft 84 has fixed thereto a second gear 85 inwardly of the gear 83 and the gear 85 is engaged by a plurality of planetary gears 86 which are fixed to the outer ends of shafts 86a extending through and journaled in a rotary carrier 87 which is in the form of a spur gear and which is rotatably mounted with respect to the shaft 84. The shafts 86a have planetary gears 88 fixed to the inner ends thereof which are of less diameter than the gears 86 and which mesh with a gear 89 fixed to a tubular shaft 90 rotatably mounted in axial alinement with the shaft 84 (see Figs. 13, 23, and 24). A shaft 91 is telescopically splined within the tubular shaft 90 and has fixed thereto a worm 92 which meshes with a worm wheel 93 in which the right end of the reciprocable cutter spindle 31 is splined. Assuming the planetary gear carrier 87 to be held against rotation, the gearing above described will drive the cutter spindle 31 at a fixed ratio with respect to the speed of rotation of the spindle 11 in all positions of the cutter spindle, the change gears 77 and 78, together with the change gears 48, 49, 51 and 52 providing means for varying the speed ratio between the two spindles as desired, the ratio of the speeds of the spindles corresponding to the ratio between the number of teeth of the cutter and the number of teeth of the gear being generated.

The worm wheel 75 carries a radially adjustable crank pin 94 (see Figs. 3, 23, and 29) to which is pivoted a connecting rod 95 which is in turn connected to a crank pin 96 on an arm 97 fixed to a shaft 98 journaled in the support 23, the crank and connecting rod serving to impart an oscillatory movement to the shaft 98, the angle of oscillation being adjustable by adjusting the crank pin 94. The shaft 98 has splined thereto an arm 99 which is connected by a link 100 to the longitudinal slide 33 in which the left side end of the spindle 31 is mounted to impart an axial reciprocating movement to the cutter spindle (see Figs. 26 and 29).

Means is provided for either manually or automatically moving the carriage 27 transversely during the operation of the machine to feed the cutter tangentially across the face of the blank, this feed movement being accomplished by means of a transverse feed lead screw 101, which has threaded engagement with a nut 102 secured to the carriage 27. The screw 101 has a squared outer end 103 which is accessible from the front of the machine and which is adapted to receive a suitable crank for rotating the screw to feed the carriage 27 in either direction. During the cutting operation, the screw is preferably automatically operated from a moving part of the machine by means which will be hereinafter described, the automatic actuating means including an oscillating arm 104 pivotally mounted on the screw 101 and carrying a pawl 105 which engages with a ratchet 106 fixed to the screw 101 (see Figs. 31, 32 and 33). The screw 101 also has a spur gear 107 fixed thereto which meshes with a gear 108 fixed to a shaft 109 and the shaft 109 has fixed thereto a worm 110 which meshes with the worm gear 111 fixed to a short longitudinally extending shaft 112. The shaft 112 has a miter gear 113 fixed to its forward end which meshes with a miter gear 114 fixed to the inner end of a transverse shaft 115 which has fixed to its outer end a gear 116 which meshes with a gear 117 on an adjustable counter shaft 118 to which is fixed a second gear 119, which meshes with a gear 120 fixed to the outer end of a shaft 121. The gears 116, 117, 119 and 120 are cutter size change gears accessible at the front of the machine and may be replaced with gears of various sizes to obtain the desired gear ratio for a cutter of the given pitch diameter (see Fig. 30). To the inner end of the shaft 121, there is fixed a gear 122 which meshes with a gear 123 on a shaft 124 which has a second gear 125 meshing with the planetary gear 87. Any rotary movement of the lead screw 101 imparting a lateral cross feed movement to the carriage 27 imparts through the gearing above described a proportional rotary movement to the planetary gear carrier 87 and by the rotation of the differential gears 86 and 88 about the axis of gears 85 and 89 effects a proportional variation in the speed of rotation of the cutter spindle. By providing a correct gear ratio between the lead screw 101 and the planetary gear carrier 87, the necessary control of the speed of rotation of the cutter spindle may be obtained to accurately correlate the speed of rotation of the given cutter with respect to the imaginary generating rack so as to maintain the cutter in correct intermeshing engagement with the generating rack of the gear during the lateral feed movement of the cutter.

Gear housings

For convenience in assembly and to afford convenient access for lubrication, replacement and repair, most of the power transmission gearing is mounted exteriorly of the main framework of the machine in suitable gear housings.

As shown in Figs. 1, 2, 3, 4, 5, 6, 23, 25, 30, 31 and 32, the gearing for driving the worm shaft 91 from the shaft 76 and from the lead screw 101 is enclosed in a gear housing 126 at the front side of the machine, the casing 126 being provided with a hinged door 127 affording access to the cutter size change gears 116, 117, 119 and 120 in the gear train between the screw 101 and the planetary gear carrier 87.

As shown in Figs. 3, 5, 6 and 23, the worm 74 and worm wheel 75 are enclosed in a housing 128 on the rear side of the machine, the housings 126 and 128 being mounted on the longitudinally adjustable support 23.

As shown in Figs. 2, 3, 6, 22 and 26, the speed change gears 45 and 46 are mounted in a gear housing 130 at the front side of the machine and index change gears 48, 49, 51 and 52 are mounted in a gear housing 131 at the rear side of the machine. The gear housing 130 being provided with a hinged door 132 and the gear housing 131 being provided with a hinged door 133 so that the change gears are conveniently accessible for removal and replacement. All of the change gears are so mounted on the ends of their shafts that they may be quickly and easily detached and replaced by gears of the sizes required for obtaining the desired gear ratio.

As shown in Figs. 2, 3, 5, 6 and 25, the gears 71 and 72 are enclosed in the housing 134 at the rear end of the machine, the housing 134 being provided with a hinged door 135 affording access to the gears. The base 1 is also provided with a hinged door 136 at the rear end of the machine through which access is afforded to the motor 34 and oil pump 44. The base 1 is also provided with suitable ventilating openings 137.

Work spindle supporting and driving elements

In the machine of the present invention, the work spindle is mounted for adjustment bodily in a vertical direction and for adjustment angularly about a horizontal axis in any position of vertical adjustment. The adjusting devices and the mounting of the gears and shafts through which the spindle is driven in its various positions of adjustment will now be described in detail.

As shown in Figs. 16 and 17, of the drawings, a fixed vertically disposed screw 138 is mounted in the turret standard 7, this screw being rigidly clamped to the top of the standard by means of a flange 139 on the screw which engages the underside of the cap plate of the standard and a nut 140 threaded on the upper end of the screw 138. A sleeve nut 141 is mounted to travel vertically on the threaded portion of the screw 138 and supports the vertically adjustable work spindle head 9 through a bracket 142 rigidly attached to the head 9 in which the sleeve nut is rotatably mounted. A spiral gear 143 is keyed to the sleeve nut 141 and held in place thereon by a nut 144. Means is provided for manually rotating the spiral gear and nut to raise or lower the head 9 and this means consists of a shaft 145 journaled in and extending transversely through the head 9 above the work spindle 11 and having a spiral gear 146 meshing with the spiral gear 143. The shaft 145 has a squared outer end 147 adapted to receive a suitable hand crank for turning the shaft and the shaft 145 has mounted thereon, outside the head 9, a graduated dial 148 which co-operates with a suitable marking on the adjacent portion of the head 9 to accurately indicate the extent of angular movement imparted to the shaft 145. When it is desired to adjust the work spindle head 9 vertically, the clamping bolts 10 are loosened and the shaft 145 is rotated which in turn rotates the nut 141 causing it to move up or down on the screw 138 thus raising or lowering the head 9. Fine adjustments of the supporting head 9 may be obtained by turning the shaft 145 through fractions of a revolution which may be accurately acertained by means of the dial 148 and, when the head has been accurately adjusted to position the spindle 11 at the desired height, the head 9 may be rigidly locked in adjusted position by tightening the clamping nuts 10.

As shown in Fig. 18 of the drawings, the tubular work spindle 11 at substantially each end is journaled in ball bearings 149 and 150 in the head 9, said bearings being preloaded will rigidly hold the spindle against endwise play in the head. The spindle 11 projects beyond the outer end of the head 9 and the worm wheel 67 is fixed to the projecting end of the spindle, the worm wheel 67 and its driving worm 66 being enclosed in a suitable housing 151 secured by bolts 152 to the outer end of the head 9. The outer wall of the housing 151 has a circular opening closed by a detachable cover plate 153, the opening being of a diameter sufficient to permit the worm wheel 67 to be placed on the spindle or removed therefrom through the outer side of the housing. The cover plate 153 is provided with a central aperture having an inwardly projecting flange 154 surrounding the outer end of the spindle 11 for retaining all oil and also for convenience in attaching and detaching the arbor 16, as will be hereinafter more fully explained.

As shown in Figs. 18 and 19, the transverse worm shaft 65 is mounted in a rigid supporting member 155, which is adjustably mounted in the upper portion 151A of the housing 151. The supporting member 155 is provided with end walls 156 and 157 which are apertured to receive ball thrust bearings 158 and 159 in which the ends of the shaft 65 are journaled and by means of which the shaft is rigidly held against endwise movements. The end wall 157 has a horizontal extension 160 outside the housing 151 which provides a bearing bracket for the upper end of the vertical shaft 62, the miter gear 63, which is splined to the shaft 62 having an elongated hub 161 which is journaled in and held against axial movement by ball bearings 162 mounted in an aperture in the bearing bracket 160. The bearings 162 are secured in place in the extension 160 by means of a retaining ring 163, bolted to the under side of the extension and the miter gears 63 and 64 are enclosed in the housing formed by the bearing bracket 160 and a detachable cap plate 164. The vertical shaft 62 is splined for a considerable portion of its length to permit vertical adjustment of the head and the cap plate 164 is provided with an aperture 165 in alinement with the shaft 62 through which the shaft 62 projects when the head is lowered. The adjustable supporting member 155 is provided with a central boss 166, which has a screw threaded opening to receive a screw 167 which is secured to the upper portion 151A of the housing 151. The upper end of the screw 167 is provided with a squared portion 168 which is adapted to receive a suitable tool for turning the screw to adjust the supporting member 155 in the housing. The screw 167 is provided with a flange 169 which fits in a recess in the under side of the upper portion 151A of the housing 151. The upper part of the screw 167 below the squared portion 168 is threaded to receive a clamping nut 170 which, when tightened rigidly clamps the upper portion 151A between the flange and nut, holding the screw against rotation. When it is desired to adjust the supporting member 155, the nut 170 is loosened and the screw 167 is turned to impart the desired upward or downward movement to the supporting member 155. The adjustment above described permits the shaft 65 to be adjusted to obtain the most effective intermeshing engagement between the worm 66 and the worm wheel 67, the adjustable support for the shaft providing means for adjusting the worm 66 toward the axis of the worm wheel 67, or away from the axis of the worm wheel 67 to the position in which the worm and worm wheel operate most efficiently.

It will be apparent that the driving connections through the vertical shaft 62, miter gears 63 and 64, transverse shaft 65, worm 66 and worm wheel 67 provide means for continuously driving the work spindle 11 from the shaft 62 in any position of vertical or angular adjustment. The various angular adjustments of the work spindle and the positions occupied by the gears and shafts through which the spindle is driven in the various positions of adjustment is shown diagrammatically in Figs. 14 and 15 in which the work spindle 11 is shown in reverse angular positions.

The drive for the work spindle is through the vertical shaft 56 which is positioned at the axis of the turret 4 and rotation is transmitted from the shaft 56 to the shaft 62 through the horizontal shaft 59 which is disposed radially with respect to the shaft 56 and is adjustable angularly with the turret. It will, therefore, be apparent that the vertical shaft 62 and the work spindle 11 will be driven at uniform speed in any angular position of adjustment of the turret.

Figure 20:
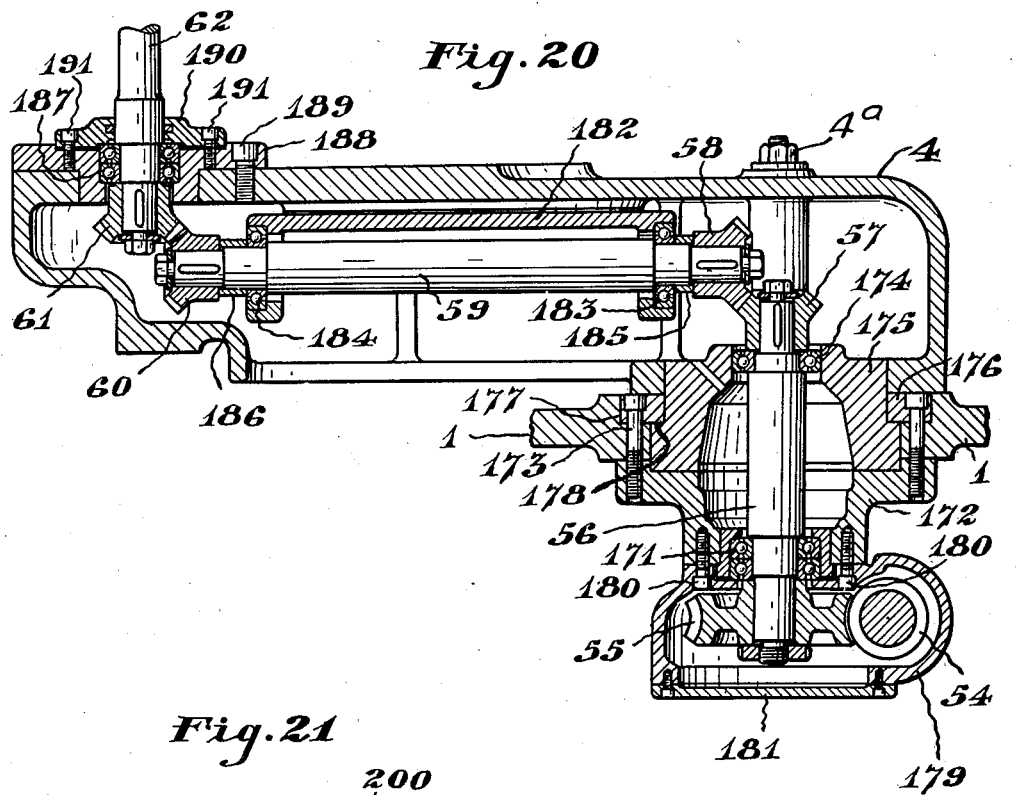
Fig. 20 is a vertical section taken radially through the base of the work spindle turret showing the gearing at the base of the turret for driving the vertical shaft in the turret standard from a horizontal shaft in the base of the machine.

As shown in Fig. 20 of the drawings, the vertical shaft 56 is supported in ball thrust bearings 171 mounted in a housing member 172 which is secured by bolts 173 to the base 1. The upper end of the shaft 56 is journaled in ball bearings 174 mounted in an upper housing member 175, which fits in an aperture in the top wall of the base 1 and rests upon the lower housing member 172. The upper housing member 175 is held in place by a clamping ring 176 which is secured in a recess 177 in the top wall of the base member 1 and which overlies a shoulder 178 of the housing member 175. The clamping ring 176 is held in place by the bolts 173 which extend down through the ring 176 through the top wall of the housing 1 and are threaded in the lower housing member 172. The worm 54 and worm gear 55 are enclosed in a housing 179 attached by bolts 180 to the housing member 172, the housing 179 being provided with an aperture in its bottom wall of a size to permit insertion or removal of the worm gear 55, this aperture being closed by a cover plate 181. The radially disposed shaft 59 is carried by a supporting member 182 detachably secured within the base 4 of the turret, the supporting member 182 having bearing apertures at the ends thereof supporting ball bearings 183 and 184 in which opposite ends of the shafts 59 are journaled. The inner raceways of the bearings 183 and 184 are clamped against shoulders on the shaft 59 by means of spacer sleeves 185 and 186 interposed between the miter gears 58 and 60 and the bearings, the miter gears 58 and 60 being detachably secured to the ends of the shaft 59.

The vertical shaft 62 is supported at its lower end in a ball thrust bearing 187 which is mounted in a supporting plate 188 detachably secured to the base 4 of the turret by bolts 189 and the bearing 187 is clamped in the plate 188 by means of a clamping plate 190 secured to the top of the supporting plate 188 by bolts 191.

Figure 21:
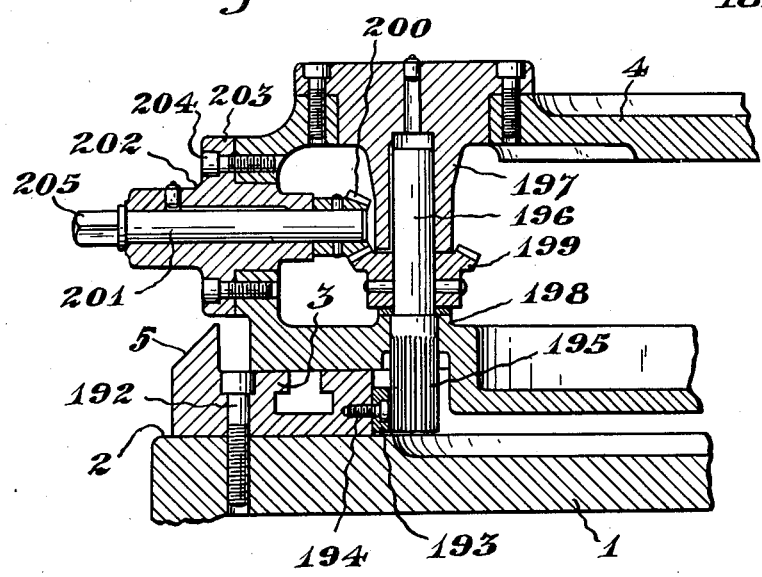
Fig. 21 is a vertical section taken on the line indicated at 21—21 in Fig. 6 looking in the direction of the arrows, showing the mechanism for adjusting the work spindle turret.

As shown in Fig. 21 of the drawings, the arcuate way 3 for the turret is secured in place on the base 1 by means of bolts 192, the way 3 being in the form of an arcuate track to the inner edge of which is attached an arcuate rack 193, concentric with the vertical axis of the turret, which is secured to the way 3 by bolts 194. The rack 193 is engaged by a pinion 195 which is carried by a vertical shaft 196 journaled in bearing bosses 197 and 198 in the upper and lower walls of the base 4. The shaft 196 has fixed thereto between the bosses 197 and 198, a bevel gear 199 which meshes with a bevel pinion 200 on a short horizontal shaft 201, which is journaled in a bearing sleeve 202 which fits in an aperture in the side wall of the base 4 and which is provided with an attaching flange 203 which is secured to the base 4 by means of bolts 204. The shaft 201 projects beyond the outer end of the sleeve 202 and is provided with a squared end 205 adapted to receive a suitable hand crank or other tool for rotating the shaft. When it is desired to adjust the turret angularly, the clamping bolts 4a are loosened and the shaft 201 is rotated driving the pinion 195 and causing the same to travel along the rack 193, thereby causing the turret to turn about its axis. The angular adjustment of the turret may be accurately determined by means of the scale 5 and vernier 6 so that the turret can be accurately adjusted to the helix angle of the gear to be generated, the turret being rigidly secured in adjusted position by tightening the bolts 4a after it has been adjusted to the proper angular position.

As shown in Fig. 22 of the drawings, the transverse shaft 47 is provided with a reduced end portion 206 which is journaled in ball bearings 207 mounted in the inner wall of the gear housing 130. At its opposite end, the shaft 47 has a reduced portion 208 journaled in ball bearings 209 mounted in the inner wall of the gear housing 131, the shaft 47 has splined ends projecting into the housings 130 and 131 and the gears 46 and 48 are secured to the shaft by clamping nuts 210 and 211.

The short shaft 35 carrying the sprocket 38, pulley 40 and gear 45 is journaled in two sets of ball bearings 212 and 213 mounted in the inner wall of the housing 130 and is held against endwise play by means of a central flange 214, which is interposed between the ball bearings 212 and 213. The bearings 212 and 213 are clamped in the wall of the housing 130 by means of a cap plate 215 which clamps the outer raceways of the bearings against the inner end of the bearing seat, the bearings 212 and 213 being spaced by a ring 216 of the same width as the flange 214 of the shaft 35.

The housing 179 is provided with transversely alined apertures in its front and rear walls to receive the worm shaft 53, the rear aperture of the housing being of a size to permit the insertion of the worm 54 into the housing. The inner end 217 of the shaft 53 is reduced and journaled in ball bearings 218 carried by a bearing sleeve 219 mounted in the aperture of the front wall of the housing 179. The inner races of bearings 218 are clamped by a nut 220 on the end of the shaft 53 against a spacing sleeve 221, interposed between the inner races of the bearing and a shoulder at the front end of the worm 54. The outer races of the bearing 218 are clamped by a cap plate 222, against a shoulder 223 at the inner end of the sleeve 219. The cap plate 222 also serves to cover the end of the shaft 53. The other end of the shaft 53 is journaled in a ball thrust bearing 224 mounted in the inner wall of the housing 131 and the gear 52 is secured to the outer end of the shaft 53 by clamping nut 225.

The miter gears 68 and 69 through which the longitudinal shaft 70 is driven from the transverse shaft 47 are enclosed within a housing 226, integral with housing 179, provided with apertures to receive the shafts 47 and 70, the shaft 47 being journaled in a ball bearing 227 mounted in the housing wall adjacent the miter gear 68 and the shaft 70 being journaled in a ball bearing 228, in the rear end wall of the housing. The bearing 227 is clamped between a retaining plate 229 bolted to the outside of the housing and a spacer sleeve 230 interposed between the inner race ring of the bearing 227 and the hub of the miter gear 68. The bearing 228 is a radial thrust bearing holding the shaft 70 against endwise movement. The outer races of the bearing 228 are clamped between a clamping plate 231 bolted to the rear end wall of the housing 226 and a shoulder at the inner end of a supporting sleeve 232. The inner races of the bearing are clamped between a shoulder on the shaft 70 and a spacing sleeve 233 interposed between the hub of the miter gear 69 and the bearing. The gear 69 is held in place and endwise clamping pressure is exerted on the sleeve 233 and bearing 228 by means of a nut 234 on the end of the shaft 70. An end wall of the housing 226 is in the form of a detachable cover plate 235 so that in assembling the machine, the gears 68 and 69 may be inserted in the housing.

*Cutter spindle adjusting and actuating mechanisms*

The cutter spindle is mounted for adjustment bodily toward and away from the work spindle turret and mechanisms are provided for reciprocating the spindle axially, for oscillating the spindle about a horizontal axis, for feeding the spindle tangentially of the gear blank, for continuously driving the spindle and for varying its speed of rotation in proportion to its rate of feed movement. The spindle actuating and adjusting mechanisms will now be described in detail.

As shown in Figs. 2, 4, 5, 30 and 32, the gear housing 126 is secured to the longitudinally adjustable support 23 by means of brackets 236 and 237 which are formed integrally with the housing 126 and which are bolted to the support 23. The brackets 236 and 237 are connected to the lower portion of the housing 126 and the upper portion of the housing is supported from the transversely movable carriage 27, as will be hereinafter more fully explained.

As shown in Fig. 23 of the drawings, the transverse shaft 76 extending through the base 1 adjacent the right end of the machine is journaled at one end in ball bearings 238 mounted in a wall of the housing 126, the end of the shaft projecting into the housing 126 and having the gear 77 detachably secured thereto by means of a clamping nut 239. The opposite end of the shaft 76 is supported in the gear housing 128 which encloses the worm wheel 75 and its driving worm 74. The housing 128, which is suspended from the longitudinally movable support 23, is provided with integral brackets 240 at the top thereof which are secured to the support 23 by means of bolts 241, see Fig. 3. The inner wall of the housing 128 is provided with an inwardly projecting boss 242 which provides a support for ball bearings 243 which receive the elongated hub 244 of the worm wheel 75, the bearings 243 being mounted in a sleeve 245 fitting within the boss 242 and having their outer races clamped by a cap plate 246 bolted to the inner face of the housing 128. The inner races of the bearing 243 are clamped against a shoulder on the hub 244 by means of a nut 247 at the inner end of the hub. The housing 128 is provided with an opening on the outer side thereof of a diameter sufficient to permit insertion of the worm wheel 75 into the housing and the worm wheel 75 has a cylindrical shoulder 75a which fits within a closure ring 128a detachably secured in the opening of the housing. The end face of the worm wheel 75 which is outside the housing 128 is provided with a diametrical groove 248, see Figs. 3 and 23, which receives a T-head 249, which is retained in the groove by means of clamping plates 250 overhanging opposite sides of the groove and secured to the worm wheel 75 by bolts 251, the T-head 249 which carries the crank pin 94 is adjustable longitudinally in the groove 248 and is secured in adjusted position in the groove by the clamping plates 250. Adjustment of the head 249 and crank pin 94 in the groove 248 varies the throw of the crank pin 94 to lengthen or shorten the stroke of the cutter spindle 31. In order to accurately position the crank pin 94 to obtain the desired stroke of the cutter spindle, one of the clamping plates 250, as shown in Fig. 3 of the drawings, is provided with a graduated scale 252 with which a pointer 253 on the head 249 cooperates to accurately indicate the position of adjustment of the crank pin.

The transverse shaft 76, which is carried by the housings 126 and 128 attached to and adjustable with the longitudinally movable support 23, extends through the front and rear walls of the base 1 which are provided with longitudinal slots 254 which are of a length corresponding to the extent of longitudinal movement of the support 23 so that the shaft 76 is free to move with the support when the same is adjusted longitudinally on the base 1.

The lower portion of the outer wall of the housing 126 is in the form of a detachable cover plate 255 which affords access to the gears 77 and 78. The shaft 79 which supports the gear 78 is a stub shaft rigidly attached to the inner wall of the housing 126, the shaft 79 being provided with a head 256 which fits in a recess on the inner side of the inner wall and having a reduced portion projecting into the housing 126 which carries ball bearings 257 upon which the gear 78 is journaled, the bearings which carry the gear 78 being clamped to the shaft and the shaft clamped to the housing by means of a nut 258 on the outer end of the shaft.

The upper portion of the housing 126 has a front wall in the form of a detachable cover plate 259 which affords access to the planetary gearing and the gears interposed between the gear 78 and the planetary gearing. The shaft 81 which supports the gears 80 and 82 is journaled at its inner end in ball bearings 260 which are mounted in the inner wall of the housing 126 and, for supporting the outer end of the shaft, the cover plate 259 is provided with a boss 261 which provides a support for ball bearings 262 in which the outer end of the shaft 81 is journaled, the bearings 262 being held in place by means of the cap plate 263, which is detachably secured to the boss 261 and which covers the outer end of the shaft 81.

The shaft 84 to which the gear 83 is fixedly attached is a tubular shaft which is supported on a stub shaft 264 which is clamped to a boss 265 formed in the cover plate 259, the stub shaft 264 having a reduced end extending through the boss 265 and being rigidly clamped to the boss by means of a nut 266 at its outer end. The tubular shaft 84 is journaled on a row of ball bearings 267, carried by the stub shaft 264. As best shown in Fig. 24, the outer races of the bearings 267 are clamped against an internal shoulder on the interior of the tubular shaft 84 by means of a cap nut 268 which also serves to detachably secure the gear 83 on the shaft 84. The tubular shaft 84 projects inwardly beyond the inner end of the stub shaft 264 and the gear 85 is formed integrally with the tubular shaft 84. The shaft 84 has a reduced inner end portion upon which are mounted ball bearings 269 held in place on the shaft by a nut 270. The shaft 90 supporting the gear 89 is of tubular form and is journaled in a ball bearing 271 mounted in the inner wall of the housing 126 and held in place by a retaining plate 272. The gear 89 is fixedly attached to the tubular shaft 90 within the housing 126. To the outer side of the gear 89, the tubular shaft 90 has a reduced end portion upon which are mounted ball bearings 273 which are held in place by a nut 274 on the end of the shaft 90. The gear 87 is journaled on the ball bearings 269 and 273 and the shafts 86a to which the planetary gears 86 and 88 are attached are journaled in ball bearings 275 mounted in the gear 87. The tubular shafts 84 and 90 are held by their bearings against endwise movement and in axial alinement in the housing 126.

The worm shaft 91 which is carried by the transversely movable head 27 has a splined extension 276 which fits and extends through the internally splined tubular shaft 90 into the clearance hole in tubular shaft 84. The shaft 84 has an internal diameter greater than the diameter of the splined extension 276, so that the tubular shaft 84 may rotate freely with respect to the shaft 91.

The shaft 91 is supported in a rigid cross member 277, which is rigidly secured by bolts 278 to the trunnion 29 and by bolts 279 to the trunnion 29a. The head or housing 30 which encloses the worm 92 and the worm wheel 93 is adjustably supported on the cross member 277 by means of a screw 280 which has a threaded lower end screwed into a threaded opening in the cross member 277. The screw 280 supports the top member 281 of the housing 30 on a flange 282 formed integrally with the screw and engaging in a recess on the under side of the top member. At its upper end, the screw 280 is provided with a clamping nut 283 and with a squared end 284 above the threaded portion which receives the nut 283. The squared end 284 is adapted to receive a wrench or other suitable tool for turning the screw 280 and, when it is desired to adjust the housing 30, the nut 283 is loosened and the screw 280 is turned to raise or lower the housing 30 to obtain the adjustment desired. The housing 30 is guided during its vertical adjustment by means of flanges 285 and 286 formed integrally with the cross member 277 and engaging opposite edge portions of the housing 30. In order to rigidly lock the housing 30 in adjusted positions on the cross member 277, the housing is provided with clamping bolts 287 which extend transversely through apertures in the cross member 277, the apertures in the cross-member 277 being of a diameter somewhat greater than that of the bolts to permit the slight relative movement desired between the housing 30 and the cross member. When the bolts 287 are tightened, the front and rear walls of the upper portion of the housing 30 are rigidly clamped against opposite sides of the cross member 277 so that the housing is rigidly held against rocking or vibratory movements with respect to the cross member during operation of the machine.

The worm shaft 91 is journaled in a ball thrust bearing 288 at one end of the cross member 277 and at the other end of the cross member 277 in a ball thrust bearing 289. Ball bearing 288 is held in place by clamping nut 290 on the end of the shaft 91 and the ball bearing 289 is held in place by a clamping nut 291 on the shaft 91 at the outer side of the bearing.

The trunnion 29a closes the bearing opening in the rear end of the cross member 277 and is provided with an integral extension 292 which is journaled in a ball bearing 293 in the bearing bracket 28a, the bearing opening of the bracket 28a being closed by a cap plate 294 which is bolted to the outer face of the bracket. The trunnion 29, which is in the form of a flanged sleeve rigidly secured to the forward end of the cross member 277, by the bolts 278, is journaled in a ball bearing 295 mounted in the bearing bracket 28, the bearing 295 being held in place by means of a clamping nut 296 on the outer end of the trunnion 29. The tubular shafts 84 and 90 are journaled in the housing 126 in axial alinement with the trunnions 29 and 29a, a sufficient clearance being provided between the interior of the tubular trunnion 29 and the tubular splined shaft 90 to permit the trunnion to move freely with respect to the projecting inner end of the tubular shaft 90 in the direction of the axis of the shaft. The worm shaft 91 is mounted in the rigid cross member 277 in axial alinement with the trunnions and also with the tubular shafts 84 and 90, so that as the carriage 27 is moved back and forth across the support 23 transversely of the frame, an invariable driving relationship is maintained between the shaft 91 and the planetary gearing in the housing 126. The vertical adjustment of the housing 30 permits the adjustment of the worm gear 93 toward and away from the axis of the worm 92 so that the worm wheel can be accurately adjusted to the position in which the worm and worm wheel operate most efficiently.

As shown in Figs. 25 and 26 of the drawings, the end of the cutter spindle 31 is keyed to a sleeve guide 297 which is slidably mounted in the worm wheel 93, being keyed to the worm wheel by means of diametrically opposite gibs 298, which are secured within the elongated hub 299 of the worm wheel 93 and which are received in longitudinal grooves 300 in the sleeves 297. The hub of the worm wheel 93 is journaled in front and rear ball bearings 301 and 302 interposed between the hub 299 and the interior of the housing 30. The outer races of these bearings are mounted in annular recesses formed in the interior of the housing 30 and the inner races are clamped against shoulders on the hub by means of clamping nuts 303 and 304 on the hub. The rear flange of the hub projects rearwardly of the nut 304 to accommodate retaining bolts 305 for the adjustable gibs which will be hereinafter described in detail. The forward end of the spindle is journaled in two sets of multiple bearings 306 and 307 which are mounted within opposite ends of an internal bearing sleeve 308, which is fixed to or preferably integral with the longitudinal slide 33. The sleeve 308 is provided with internal shoulders engaging the outer races of the innermost bearing of each of the multiple bearings 306 and 307, the bearings 307 being clamped against an end of the sleeve guide 297 and the forward bearing of the multiple bearing 306 being engaged by a collar 309 at the forward end of the cutter spindle 31. The ball bearings 306 are adapted to be preloaded and fixedly secured in the internal bearing sleeve 308 by means of the flange clamp 306a which is adapted to exert the requisite clamping force to press together the ball bearings 306 against the shoulder 308a of the bearing sleeve 308. The force necessary may be, and preferably is, exerted by means of the screws 306b which have threaded engagement with the slide 33 and are adapted to force the clamping flange 306a against the outer races of the ball bearings 306, thus preloading the ball bearings by clamping the outer ball races of the ball bearings 306 firmly against the shoulder 308a. The cutter spindle 31 is provided with a clamping nut 32a for clamping the cutter 32 against the collar 309 and at its other end with a nut 310 serving to draw the spindle rearwardly to additionally clamp the bearing 306 and to initially clamp the bearing 307, a spacing sleeve 311 on the spindle 31 being interposed between the inner races of said bearings, so that the bearings are clamped between the spacing sleeve 311 and the collar 309 and sleeve guide 297. The spindle 31 is thus held against endwise play in the slide 33. The rear end of the housing 30 is closed by a detachable cup shaped cap 312 which covers the rear end of the spindle and sleeve guide and which has a sufficient depth to accommodate the axial reciprocating movement of the cutter spindle.

The longitudinally reciprocating spindle carrying slide 33 is connected to the link 100 by means of a bracket 313 which is fixed to the bottom of the slide 33 and extends downwardly through a longitudinal slot 314 in the housing 30. As best shown in Fig. 27, the housing 30 has a forwardly extending channel 315 which serves as a guide for the longitudinally movable slide 33. The slide 33 is held in place in the guide 315 by means of guide plates 316, which overlie opposite edge portions of the slide 33 and which are secured to the side flanges of the channel guide 315 by means of bolts 317, lateral play in the channel guide being taken up by an adjustable gib 33a. The guide 315 is mounted for slight vertical play between the front and rear side walls of the carriage 27, the downward movement being limited by flanges 318 on the forward wall of the carriage 27 and the upward movement being limited by stop bars 319 which are secured to the opposite side walls of the carriage 27 and which overlie short laterally projecting flanges 320 on the guide members 315. The stop bars 319 are detachably secured to the carriage 27 to permit assembly and removal of the housing and slide, suitable clamping bolts 321 being employed to secure the stop bars 319 to the top of the carriage 27.

Springs 322 are employed to exert downward pull on the guide 315 of the housing 30, the springs tending to hold the guide members in their lowermost position in engagement with the flanges 318. The springs 322 are mounted within the forward portion of the carriage 27 and are tension coil springs attached at their lower ends to eye-bolts 323 secured in the bottom of the carriage 27. The upper ends of the springs are attached to sleeves 324 which are secured for vertical adjustment in the side flanges of the guide 315 of the housing 30 by means of screws 325 which have threaded engagement with the interior of the sleeve and which have heads at their upper ends seated in counterbores in the flanges of the channel guide. The screws 325 may be turned by means of a screw driver to raise or lower sleeves 324 and vertical movement of the screws is prevented by threaded plugs 326 screwed into the counter bores and engaging the heads of the screws 325. The sleeves 324 are locked against turning movement on the screws 325 by means of set screws 327 in the flanges of the channel guide 315 which engage in longitudinal grooves formed in the sleeves 324. By means of the screws 325, the coil springs 322 may be put under the desired tension and the tension of the springs may be adjusted from time to time, as may be found desirable.

The shaft 98, see Fig. 29, is journaled in the longitudinally movable support 23 and is splined to the arm 99, which is mounted for movement with the carriage 27, so that the arm 99 slides over the splined end of the shaft 98 during lateral movements of the carriage 27 to accommodate the oscillating arm 99 during the movements of the carriage 27. The top of the support 23 is provided, as shown in Figs. 23 and 29, with an opening 328 of sufficient size to accommodate the movements of the arm 99 during the travel of the carriage 27. At the rear side thereof, as shown in Fig. 23, the carriage 27 is provided with an apron 329 which rests upon the bed 25 and which serves to cover the portion of the opening 328, which would otherwise be uncovered when the carriage is adjacent the housing 126.

In the operation of the machine, the extension flanges 320 of the guide members 315 of the housing 30 are held against the stop bars 319 during the cutting stroke of the cutter spindle and are held by the springs 322 substantially against the flanges 318 of the carriage 27 during the return stroke, there being sufficient play between the stop bars 319 and the flanges 318 to permit the cutter to be lowered sufficiently to clear the work during the return stroke. Means is provided for automatically exerting an upward pressure on the guide member 315 during the cutting stroke of the spindle. To accomplish this result, a cam 330 is splined to the shaft 76, as shown in Figs. 23, 25 and 26. The cam 330 is journaled in a bearing bracket 331 attached to the bottom of the carriage 27, the cam having a hub which is journaled in a ball bearing 332 mounted in the bearing bracket 331, the bearing 332 being held in place by a retaining ring 333 on the bearing bracket 331 and a nut 334 on the hub of the cam. The cam 330 is engaged by a roller 335 which is carried by the lower end of a lever arm 336, which is keyed at its forward end to a transverse shaft 337, journaled in the bottom of the carriage 27. The shaft 337 has keyed thereto a short forwardly extending arm 338 which is connected to the extension members 315 of the housing 30 through a thrust link 339, which has a rounded upper end engaging a rounded seat in saddle 340 fixed to the under side of the housing and a rounded lower end seated in a saddle 341 which is adjustably mounted on the forward end of the lever 338, the saddle 341 having a tapered base which is engaged by a wedge member 342, which is adjustable on the arm 338 by means of a screw 343.

The cam 330 has a portion of its peripheral surface of less diameter than the remainder, so that during each revolution of the shaft 76, the roller 335 engages the raised portion of the cam and the low portion of the cam. The cam is so mounted on the shaft 76 that the raised portion thereof engages the roller 335 during the cutting stroke of the cutter spindle and the lower portion engages the roller during the return stroke of the cutter spindle. While the roller 335 is in engagement with the raised portion of the cam, upward pressure is exerted on the forward extension of the housing 30 to hold the guide 315 in engagement with the stop bars 319, so that the cutter 32 is held at a fixed elevation and moves horizontally during the cutting stroke. When the roller 335 engages the low portion of the cam 330 at the end of the cutting stroke, the springs 322 snap the forward end 315 of the housing 30 downwardly into engagement with the flanges 318 so that at the end of the cutting stroke, the cutter is instantly moved downwardly to a position in which it will clear the blank during the return stroke. The arm 336 is a long arm which is arched up over the shaft 98 and this arm has sufficient resiliency to provide a yielding thrust on the cam 330 so that excessive stresses in the lever and excessive thrusts on the lever and cam bearings are avoided. By adjustment of the wedge 342, the upward pressure exerted on the housing extension 315 may be regulated to provide the desired upward thrust during the cutting stroke.

The rocking movement of the housing 30 is permitted by the trunnions 29 and 29a and this movement does not affect the drive to the cutter spindle, which is continuously rotated during the return stroke, as well as during the cutting stroke.

As shown in Fig. 29 of the drawings, the splined shaft 98 which actuates the arm 99 to reciprocate the cutter spindle slide 33 is journaled in ball bearings 344 which are clamped in a sleeve 345 mounted in the support 23 by means of a clamping ring 346. The shaft 98 is clamped to the inner race of the ball bearings 344 between a flange 347 on the shaft and a hub of the arm 97 which is clamped and secured on the shaft by means of a nut 348 and a conventional key, not shown. The arm 99 has an elongated hub 349 in which the shaft 98 is splined and this hub is journaled in ball bearings 350 which are clamped by a nut 351 on the hub. The connecting rod 95 is journaled on ball bearings 352 carried by the pivot pin 96 and the link 100, see Figs. 25, 26 and 29, is journaled on ball bearings 353 carried by the pivot pin 99a carried by the arm 99.

Fig. 28 of the drawings shows the mounting of the change gears 48, 49, 51 and 52 by means of which the speed ratio between the work and cutter spindles may be adjusted. In order to obtain a wide range in speeds by means of the change gears, the shaft 50 is mounted for angular adjustment about the axis of the shaft 47 and also for radial adjustment with respect to this axis. The shaft 50 is mounted on an arm 354 which is pivoted on the shaft 47 and this arm is provided at its outer end with an arcuate slot 355 which is concentric with the shaft 47. The slot 355 receives a bolt 356 which is secured to the inner wall of the housing 131 and the arm may be clamped in any position of angular adjustment within the limits permitted by the slot 355, by means of the clamping bolt. The shaft 50, as shown in Fig. 22 of the drawings, is provided at its inner end with a T-head 357, which is mounted for adjustment longitudinally in an under-cut slot 358 in the arm 354, which is disposed radially with respect to the axis of the shaft 47. The gears 49 and 51 are secured on the shaft 50 by means of a clamping nut 359 which also serves to secure the shaft 50 in adjusted position on the arm 354. By angular adjustment of the arm 354, and radial adjustments of the shaft 50 in the arm 354, a large number of speed ratios may be obtained between the shaft 47 from which the cutter spindle is driven and the shaft 53 from which the work spindle is driven, the adjustments of the arm 354 and shaft 50 being determined by the sizes of the gears on the shafts 47, 50 and 53.

As shown in Fig. 30 of the drawings, the shaft 118 carrying the change gears 117 and 119 which are interposed between the change gears 116 and 120 is mounted upon an arm 360 which is pivoted to the shaft 121 and provided with an arcuate slot 361 which is concentric with the shaft 121, the arm 360 being angularly adjustable about the shaft 121 and adapted to be secured in adjusted position by means of a bolt 362 carried by the inner wall of the housing 126 and extending through the slot 361.

The shaft 118 is mounted for adjustment in a slot 363 in the arm 360 which is disposed radially with respect to the axis of the shaft 121. By angular adjustment of the arm 360 and adjustment of the shaft 118 in the slot 363, the shaft 118 can be disposed at the required distances from the shafts 115 and 121 to accommodate gears of the desired relative pitch diameters so that a large number of speed ratios may be obtained between the lead screw 101, see Fig. 32, and the planetary differential gear carrier 87 to obtain the desired variation in the speed of rotation of the cutter spindle to compensate for lateral feed movement of the cutter.

The screw 101 may be operated manually to shift the carriage laterally, but it is preferable that the screw be automatically actuated during the gear cutting operation. To this end, a connecting rod 364 is pivoted to the outer end of the pawl carrying arm 104 by means of a pivot 365, which also provides a pivotal support for the pawl 105. The lower end of the connecting rod 364 is connected to an actuating lever 366, which is pivoted on a shaft 367 carried by the lower end of the housing 126. The connecting rod 364 is adjustably connected to the lever 366 by means of a pivot bolt 368 which is adjustable in a curved slot 369 in the lever 366 to vary the throw of the lever and the extent of angular movement imparted to the pawl carrying arm 104. The lever 366 is pivoted intermediate its ends and carries a pivot 370 at one end to which is attached a connecting rod 371, which, as shown in Fig. 23, is journaled at its upper end on an eccentric 372, which is fixed to the transverse shaft 76. The lever 366 is oscillated during each revolution of the shaft 76 by means of the connecting rod 371 and imparts an oscillating movement to the pawl carrying arm 104. During upward movement of the pawl carrying arm 104, the pawl 105 imparts a turning movement to the ratchet 106 and during the downward movement of the arm 104, the pawl rides over the teeth of the ratchet.

By adjusting the pivot bolt 368 in the slot 369, the extent of angular movement of the pawl carrying arm 104 may be varied to vary the extent of angular movement of the ratchet 106 for each revolution of the shaft 76. The shaft 76 also actuates the spindle reciprocating mechanism imparting a reciprocation to the cutter spindle for each revolution of the shaft, and the ratchet actuating mechanism may be so arranged as to impart the tangential lateral feed movement to the carriage 27 during any desired portion of the stroke of the cutter spindle. Means is provided for automatically disengaging the ratchet actuating pawl to discontinue the feed movement after the desired lateral travel of the carriage. The automatic pawl throwout device comprises a controlling arm 373 pivoted to the shaft 365 and provided with a shoulder 374 which is engageable with a pin 375 on the pawl. The outer end of the arm 373 carries a spring pressed pin 376, see Fig. 33, which is adapted to engage in a spiral groove 377 formed in the outer face of the ratchet 106, the pin being provided with a knurled handle 378 by means of which it may be withdrawn from the groove to permit the pin to be engaged with any portion of the spiral groove at the beginning of the cutting operation.

During the cutting operation, the spiral groove 377 causes the arm 373 to move inwardly toward the center of the ratchet, swinging the shoulder 374 toward the pin 375 and when the pin 376 is brought to the inner end of the spiral groove, the shoulder 374 will be swung to a position in which the pawl 105 is held out of engagement with the ratchet during the complete oscillation of the arm 104 so that the tangential lateral feed movement of the carriage 27 is discontinued. At the beginning of the cutting operation, the pin 376 may be engaged with any desired portion of the spiral groove to permit the desired tangential lateral feed movement of the carriage 27 and upon completion of this predetermined feed movement, the pawl will be automatically shifted out of ratchet engaging position and no further feed movement will be imparted to the carriage.

As shown in Fig. 32 of the drawings, the screw 101 and nut 102 are so mounted that they are readily removable when desired and may be quickly and easily assembled in the machine. The inner end of the screw is threaded for engagement with the nut 102 attached to the tangential lateral feed carriage 27 and is provided with a cylindrical portion 379 outwardly of the threaded portion. At the outer end of the threaded portion, the screw is provided with an integral flange 380 and the cylindrical portion 379 is journaled in the bearing bracket 236, made integral with the housing 126 and which has a bearing aperture 381. The cylindrical portion of the screw is journaled in ball bearings 382 which are mounted in the aperture 381. Outwardly of the bracket 236, the pawl carrying arm 104 is journaled on ball bearings 383. The gear 107 is keyed to the cylindrical portion of the screw 379 outwardly of the arm 104 and is secured in place by a clamping nut 384 which also serves to clamp the bearings 382 and 383. The ratchet 106 is rigidly attached to the gear 107 by means of clamping bolts 385. The shaft 115 is journaled in ball bearings 386 carried in a bearing bracket 387 integral with and within the housing 126 adjacent the bottom thereof, and the shaft 115 drives the shaft 112 through the miter gears 114 and 113. The shaft 112 is journaled in ball bearings 388 and 389 in bearing brackets 390 and 391 which are formed integrally with the rear wall of the housing 126, the shaft 112 and gears carried thereby being mounted behind the change gears 116 and 117 which are disposed at the front of the housing for convenient access.

As shown in Fig. 34 of the drawings, the support 23 is adjusted longitudinally of the base 1 by means of a lead screw 392 which is journaled in a bearing sleeve 393 attached to the right end of the base 1 and which has threaded engagement with a nut 394 rigidly attached to the bottom of the support 23, the screw being provided with a hand wheel 395 by means of which the support may be adjusted.

The adjustment of the support 23 is provided in order that the axial stroke of the cutter may be properly adjusted with respect to the gear being cut. The position of the gear on the arbor 16 may vary and the adjustable support 23 provides means whereby the axial stroke of the cutter may be centered with respect to the gear being cut. The radial adjustment of the crank pin 94 permits variation in the length of the stroke of the cutter and by properly adjusting the support 23 and the crank pin 94, the reciprocating stroke of the cutter may be made such that it is just sufficient to carry the cutter across the face of the gear being cut.

As shown in Figs. 35 and 36 of the drawings, the retaining bolts 305 which clamp the gibs 298 to the hub 299 of the worm wheel 93 extend through apertures in the hub 299 which are of slightly greater diameter than the bolts so that the gibs may be adjusted laterally to bring them into snug engagement with the side walls of the grooves 300 in the sleeve 297. Two of the gibs are provided for each of the grooves and these gibs may be adjusted by means of spacing wedges 396 interposed between the gibs of each pair. The wedges 396 taper inwardly and may be moved radially to crowd the gibs 298 against the side walls of the grooves 300 by means of set screws 397 threaded in the hub 299 and engaging the outer faces of the wedges. By loosening the retaining bolts 305 and adjusting the screws 397, the gibs 298 may be crowded with the desired amount of pressure against the side walls of the grooves 300, whereupon the gibs may be rigidly locked in their adjusted positions by tightening the bolts 305 and securing the set screw 397 in its adjusted position, a lock nut 398 being provided for this purpose on the set screw which engages with the outer surface of the hub 299. The adjustable mounting of the gibs insures a close fit in the grooves 300, so that there is no relative turning movement permitted between the worm gear 93 and the cutter spindle and permits adjustment of the gibs to compensate for wear. The provision of diametrically opposed gibs equalizes the frictional drag on opposite sides of the spindle axis and balances the driving torque on the spindle carrying sleeve.

Lubricant circulating system

During the operation of the cutter, a suitable nozzle (not shown) is provided for directing a stream of lubricant or cooling fluid over a portion of the cutter engaging the work and, immediately beneath the reciprocating cutter, there is mounted a drip spout 399 which is attached to the front of the transversely movable carriage 27, the spout being of sufficient width and length to receive the liquid dripping from the cutter during the stroke of the cutter. The spout 399 moves laterally with the carriage 27 and is provided with a suitable strainer 400 which strains out particles of metal carried with the liquid into the spout. At the forward end thereof, the extension of the housing 30 has a depending flange 401 which serves as a drip flange to direct the liquid flowing from the cutter into the spout 399. The spout 399 delivers into a stationary spout 402 secured to the base 1 and of sufficient length to receive liquid from the spout 399 in all positions of the carriage 27 upon which the spout 399 is mounted. The spout 402 delivers into a lubricant receptacle 403 which is connected by a pipe 404 to the pump 44 which has a delivery pipe 405 which extends laterally to the rear wall of the machine and upwardly to a suitable hose or nozzle connection for delivering the liquid to the cutter. At the rear side of the base, the delivery pipe 405 is provided with a drain faucet 406 which is controlled by a valve 407 so that the liquid may be quickly drained from the receptacle 403 when it is desired to provide a fresh supply of liquid.

Operation

In the operation of the machine, the gear blank is mounted upon the work spindle and the work spindle carrying head 9 is adjusted vertically on the standard 7 to a position such that the pitch cylinder of the gear to be generated is tangent to a horizontal plane tangent to the pitch cylinder of the cutter during the cutting stroke and the turret is then adjusted angularly to dispose the axis of the work spindle at an angle to the axis of the cutter spindle corresponding to the helix angle of the gear to be generated; it being understood that spur gears have a zero helix angle. The vertical axis of the work spindle turret is positioned beneath the arbor to which the gear blank is attached, but it is not necessary that the gear blank be accurately centered with respect to this axis, since the lateral feed of the cutter tangentially of the gear blank during the cutting operation causes the cutter to move across the face of the blank even though the blank be disposed to one side or the other of the vertical axis of adjustment.

In generating helical gears, the pitch cylinder of the cutter is positioned in tangency with a plane tangent to the pitch cylinder of the gear being generated and the molding generating action of the cutter extends throughout the length of the stroke of the cutter, which is across the face of the gear. The tangential feed movement causes the line of tangency of the cutter pitch cylinder to travel along the line of tangency of the gear being generated with the common tangent plane so that the cutter which is generating the imaginary rack of the gear during its axial reciprocating and lateral feed movements cuts the teeth in the gear blank to their full depth throughout the length of the teeth, having a double molding generating action, one due to the rotation of the cutter and work, while the other is comparable in this regard to that of a generator of the rolling rack type.

For cutting a given gear, the speed ratio provided by the driving mechanism between the cutter spindle and work spindle must correspond to the ratio between the number of teeth of the cutter and the number of teeth in the gear being cut. This speed ratio may be readily obtained by the change gears 48, 49, 51 and 52 in the housing 131, together with the change gears 77 and 78 in the housing 126 at the lower end of the machine. The speed ratio between the feed screw 101 and the planetary gear carrier 87 necessary to maintain the cutter in mesh with the imaginary rack of the gear being generated is dependent upon the pitch of the screw threads and the pitch diameter of the cutter and the correct ratio may be obtained between the screw 101 and the planetary gear carrier 87 by means of the change gears 116, 117, 119 and 120 in the housing 126, so that the tangential feed movement of the cutter spindle varies its speed of rotation by the amount necessary to maintain the cutter in intermeshing engagement with the imaginary generating rack.

The intermeshing relationship between the gear being generated and the cutter with the generating rack may be obtained by varying the speed of either spindle proportionally to the rate of feed movement, the planetary speed varying mechanism being herein shown applied to the drive mechanism for the cutter spindle. It is to be understood, however, that this mechanism could, if desired, be applied to the drive for the work spindle.

Having adjusted the driving mechanism to obtain the proper speed ratio between the work and cutter spindles and having adjusted the support 23 and crank pin 94 to properly adjust the stroke of the cutter with respect to the gear being cut, the machine may be started in operation with the controlling arm 373 properly engaged with the groove 377 on the face of the ratchet and with the pivot bolt 368 properly adjusted on the lever 366 to obtain the desired rate of tangential lateral feed movement of the carriage 27.

The cutter, which is rotated in timed relation with the work, is also rapidly reciprocated and fed slowly in a tangential lateral direction, gradually enters the blank until the cutter teeth are engaged to their full depth and, during the movement of the cutter across the face of the blank, the gear is completely generated, the teeth being cut to their full depth from end to end. The finished gear may then be removed from the work spindle and the carriage returned to its original position by manually actuating the screw 101, whereupon a second gear blank may be positioned on the work spindle and the operation repeated.

It will be apparent that the machine of the present invention operates with a minimum of friction due to the fact that all rotating driving elements are journaled in ball bearings, that the machine will operate with a minimum vibration due to the fact that all shafts are rigidly held by thrust bearings against endwise movements, all bearings being provided with threaded clamping members to take up any play which may be caused by wear. Furthermore, all of the gearing is conveniently accessible for replacement or repair and so mounted in the machine that the machine may be quickly and easily assembled.

It should be noted that the rotation of the cutter in the machine of the present invention is much more rapid than is customary in gear shapers and by reason of the rapid rotation and relatively slow feed movement, the double molding generating action of the cutter is uniform throughout the gear being generated, since the cutter is so moved that during the cutting operation, it is continuously generating the imaginary rack of the gear being cut, the generating action of the cutter on the blank corresponding to that of a generating rack continuously moving in mesh with the gear and generating the teeth thereof on the molding generating principle.

What I claim is:

1. In a gear shaper, a work spindle, a cutter spindle, means for supporting the spindles in laterally spaced relation and for adjusting one angularly in a plane separate from but parallel to the plane of the axis of the other, means for reciprocating the cutter spindle axially, means for imparting a feed movement to one of the spindles, and means for driving said spindles in their various relative positions, and for maintaining a predetermined relation between their speeds of rotation.

2. In a gear shaper, a work spindle, a cutter spindle, means for supporting the spindles in laterally spaced relation and for adjusting one angularly in a plane separate from but parallel to the plane of the axis of the other, means for reciprocating the cutter spindle axially, means for imparting a feed movement to one of the spindles in a plane parallel to the axis of the other, and means for driving said spindles in their various relative positions and for maintaining a predetermined relation between their speeds of rotation.

3. In a gear shaper, a work spindle, a cutter spindle, means for supporting the spindles, one spaced laterally with respect to the other, means for imparting a feed movement to one of the spindles laterally with respect to the other in a plane separate from but parallel to the plane of the axis of the other, means for reciprocating the cutter spindle axially and means for driving said spindles and for maintaining a predetermined relation between their speeds of rotation.

4. In a gear shaper, a work spindle, a cutter spindle, means for supporting the spindles, one spaced laterally with respect to the other, means for reciprocating the cutter spindle axially, means for feeding the cutter spindle in a direction lateral with respect to its axis and in a plane spaced from the plane of the work spindle, and means for driving said spindles and for maintaining a predetermined relation between their speeds of rotation.

5. In a gear shaper, a work spindle, a cutter spindle, means for supporting the spindles in laterally spaced relation and for adjusting one angularly in a plane separate from but parallel to the plane of the axis of the other, means for reciprocating the cutter spindle axially, means for feeding the cutter spindle in a direction lateral with respect to its axis and in a plane spaced from the plane of the work spindle, and means for driving said spindles and for correlating their speeds of rotation.

6. In a gear shaper, a work spindle, a cutter spindle, means for supporting the spindles in laterally spaced relation and for adjusting one angularly in a plane separate from but parallel to the plane of the axis of the other, means for reciprocating the cutter spindle axially, means for feeding the cutter spindle in a direction lateral with respect to its axis and in a plane spaced from the plane of the work spindle, means for adjusting the work spindle bodily toward and away from the plane of feed movement of the cutter, and means for driving said spindles in their various relative positions and for correlating their speeds of rotation.

7. In a gear shaper, a work spindle, a cutter spindle, a support for the work spindle adjustable angularly about an axis transversely disposed with respect to the axis of the work spindle, a support for the cutter spindle mounted for movement in a direction transverse to the cutter spindle and to the axis of the work support, means for reciprocating the cutter spindle axially on its support, and means for driving said spindles at correlated speeds.

8. In a gear shaper, a work spindle, a cutter spindle, a support for the work spindle adjustable angularly about an axis transversely disposed with respect to the axis of the work spindle, a support for the cutter spindle mounted for movement in a direction transverse to the cutter spindle and to the axis of the work support, means for adjusting the work spindle on its support in the direction of the axis of the support, means for moving the cutter spindle support, means for reciprocating the cutter spindle axially, means for driving the work spindle in its various adjusted positions, and means for driving the cutter spindle during movements of its support and during its axial reciprocating movements and for correlating the speed of rotation of the cutter spindle with respect to the speed of rotation of the work spindle.

9. In a gear shaper, a support mounted for angular adjustment about a fixed axis, a work spindle mounted on said support and disposed at right angles to said axis, a support mounted for movement in a direction parallel to the plane of angular adjustment of the work spindle, a cutter spindle mounted on said last named support and extending at right angles to the direction of movement of its support, the plane of movement of the cutter spindle being spaced from the axis of the work spindle, a common driving means for said spindles, and means for reciprocating the cutter axially and for moving the cutter spindle support during rotation of said spindles.

10. In a gear shaper, a work spindle for supporting a gear blank, a cutter spindle adapted to have a gear shaped cutter thereon for engagement with a blank on the work spindle, means for supporting the spindles and for adjusting one angularly in a plane separate from but substantially parallel to the plane of the other to position the cutter and blank for generating a gear of the desired helix angle, means for reciprocating one of the spindles in the direction of the axis of the cutter spindle, and means for driving the spindles in their various positions of adjustment and for maintaining a predetermined relation between their speeds of rotation.

11. In a gear shaper, a work spindle for supporting a gear blank, a cutter spindle adapted to have a gear shaped cutter thereon for engagement with a blank on the work spindle, means for supporting the spindles and for adjusting one angularly in a plane separate from but substantially parallel to the plane of the other to position the cutter and blank for generating a gear of the desired helix angle, means for reciprocating the cutter spindle axially, and gearing connecting the two spindles to a common drive shaft.

12. In a gear shaper, a work spindle for supporting a gear blank, a cutter spindle adapted to have a gear shaped cutter thereon for engagement with a blank on the work spindle, means for supporting the spindles and for adjusting one angularly in a plane separate from but substantially parallel to the plane of the other to position the cutter and blank for generating a gear of the desired helix angle, means for reciprocating one of the spindles in the direction of the axis of the cutter spindle, means for adjusting one of the spindles bodily toward and away from the other to accommodate gear blanks of different diameters, and means for driving the spindles in their various positions of adjustment and for maintaining a predetermined relation between their speeds of rotation.

13. In a gear shaper, a work spindle for supporting a gear blank, a cutter spindle adapted to have a gear shaped cutter thereon for engagement with a blank on the work spindle, means for supporting the spindles and for adjusting the work spindle angularly in a plane separate from but substantially parallel to the plane of the cutter spindle, means for reciprocating the cutter spindle axially, and means for driving the spindles in their various positions of adjustment and for maintaining a predetermined relation between their speeds of rotation.

14. In a gear shaper, a work spindle for supporting a gear blank, a cutter spindle adapted to have a gear shaped cutter thereon for engagement with a blank on the work spindle, means for supporting the spindles and for adjusting the work spindle angularly in a plane separate from but substantially parallel to the plane of the cutter spindle, means for reciprocating the cutter spindle axially, means for adjusting the work spindle bodily toward and away from the cutter spindle to accommodate gear blanks of different diameters, and means for driving the spindles in their various positions of adjustment and for maintaining a predetermined relation between their speeds of rotation.

15. In a gear shaper, a work spindle for supporting a gear blank, a cutter spindle adapted to have a gear shaped cutter thereon, means for supporting the spindles, means for reciprocating one of the spindles in the direction of the axis of the cutter spindle, means for driving the spindles at the relative speeds which would be imparted to them by a rack common to the cutter and gear being generated moving longitudinally between the cutter and gear, means for moving one of the spindles transversely of the other to cause the cutter to be fed tangentially across the face of the blank, and means for simultaneously varying the speed of rotation of one of the spindles in proportion to the rate of lateral movement to maintain the cutter and gear in intermeshing relationship with respect to the imaginary generating rack during the said transverse movement.

16. In a gear shaper, a work spindle for supporting a gear blank, a cutter spindle adapted to have a gear shaped cutter thereon, means for supporting the spindle, means for driving the spindles at speeds such that the peripheral speeds of the cutter and gear being generated measured at their pitch circles are so related that the component of the peripheral speed of the gear measured in a plane at right angles to the axis of the cutter is equal to the peripheral speed of the cutter, means for shifting one of the spindles laterally with respect to the other in a plane parallel to the common tangent of the pitch circles of the gear and cutter to cause the cutter to be fed tangentially across the face of the blank, means for varying the speed of rotation of one of the spindles proportionally to the rate of movement of the laterally moving spindle to maintain a predetermined generating relationship between the cutter and gear being generated during the relative feed movement, and means for reciprocating one of the spindles in the direction of the axis of the cutter.

17. In a gear shaper, a work spindle for supporting a gear blank, a cutter spindle adapted to have a gear shaped cutter thereon, means for supporting the spindles and for adjusting one of the spindles angularly in a plane parallel to the other spindle to position the cutter and blank for generating a gear of the desired helix angle, means for driving the spindles at speeds such that the peripheral speeds of the cutter and gear being generated measured at their pitch circles are so related that the component of the peripheral speed of the gear measured in a plane at right angles to the axis of the cutter is equal to the peripheral speed of the cutter, means for shifting one of the spindles laterally with respect to the other in a plane parallel to the common tangent of the pitch circles of the gear and cutter to cause the cutter to be fed tangentially across the face of the blank, means for varying the speed of rotation of one of the spindles proportionally to the rate of movement of the laterally moving spindle to maintain a predetermined generating relationship between the cutter and gear being generated during the relative feed movement, and means for reciprocating one of the spindles in the direction of the axis of the cutter.

18. In a gear shaper, a work spindle for supporting a gear blank, a cutter spindle adapted to have a gear shaped cutter thereon, supporting means for the spindles adjustable bodily to position a cutter in intermeshing relationship with respect to gears of different diameters and angularly to position a cutter with respect to gears of different helix angles on the work spindle, gear trains including change gears for driving said spindles in their various positions of adjustment, and means for reciprocating said cutter axially.

19. In a gear shaper, a work spindle for supporting a gear blank, a cutter spindle adapted to have a gear shaped cutter thereon, supporting means for the spindles adjustable bodily to position a cutter in intermeshing relationship with respect to gears of different diameters and angularly to position a cutter with respect to gears of different helix angles on the work spindle, gear trains including change gears for driving said spindles in their various positions of adjustment, means for reciprocating said cutter axially, means for feeding the cutter spindle laterally to cause the cutter to be fed tangentially across the face of the blank, and means including a planetary gearing in the gear train for driving the cutter spindle for varying the speed of rotation of the cutter spindle proportionally to the speed of lateral movement thereof.

20. In a gear shaper, a work spindle for supporting a gear blank, a cutter spindle adapted to have a gear shaped cutter thereon, supporting means for the spindles adjustable to position the cutter in generating position with respect to the gear blank, means for reciprocating the cutter spindle axilly, means for driving the spindles at speeds such as to maintain intermeshing relationship between the cutter and gear being generated, means for feeding the cutter spindle laterally with respect to the work spindle to cause the cutter to be fed tangentially across the face of the blank, and means controlled by the lateral feed movement for varying the speed of rotation of the cutter spindle.

21. In a gear shaper, a work spindle for supporting a gear blank, a cutter spindle adapted to have a gear shaped cutter thereon, supporting means for the spindles adjustable to position the cutter in generating position with respect to the gear blank, means for reciprocating the cutter spindle axially, means for feeding the cutter spindle laterally with respect to the work spindle to cause the cutter to be fed tangentially across the face of the blank, a drive shaft, means including change gears for driving the work spindle from said shaft, means for driving the cutter spindle including change gears and planetary gearing having a rotatable carrier with gears eccentrically mounted thereon through which the cutter spindle is driven from said shaft, and means including change gears for driving said carrier from said feeding means.

22. In a gear shaper, a work spindle for supporting a gear blank, a cutter spindle adapted to have a gear shaped cutter thereon, supporting means for the spindles adjustable bodily to position a cutter in intermeshing relationship with respect to gears of different diameters and angularly to position a cutter with respect to gears of different helix angles on the work spindle, gear trains including change gears for driving said spindles in their various positions of adjustment, means for reciprocating said cutter axially, and means for varying the length of the stroke of the cutter.

23. In a gear shaper, a work spindle for supporting a gear blank, a cutter spindle adapted to have a gear shaped cutter thereon, a support for the work spindle adjustable in a direction at right angles to the cutter spindle to accommodate gear blanks of different diameters and about an axis at right angles to the cutter spindle for the generation of gears of various helix angles, a support for the cutter spindle mounted for movement in a direction transverse to the axis of the cutter, means for reciprocating the cutter spindle axially in its support, a drive shaft, means connecting the drive shaft and work spindle for driving the work spindle in its various positions of adjustment, means connecting the drive shaft and cutter spindle for driving the cutter spindle in its various positions, and means for moving the cutter spindle support during operation of the machine to feed the cutter into the periphery of the blank.

24. In a gear shaper, a work spindle for supporting a gear blank, a cutter spindle adapted to have a gear shaped cutter thereon, supporting means for the spindles adjustable bodily, one with respect to the other, to position a cutter in intermeshing relationship with gears of different sizes on the work spindle, said supporting means being also adjustable angularly, one with respect to the other, to position a cutter in intermeshing relationship with respect to gears of different helix angles, means for reciprocating the cutter axially, means for shifting the cutter spindle to hold the cutter out of engagement with the blank during movement of the cutter in one direction, and means for continuously driving the cutter and work spindles at relative speeds such as to maintain the cutter in intermeshing relationship with the gear being generated.

25. In a gear shaper, a work spindle for supporting a gear blank, a cutter spindle adapted to have a gear shaped cutter thereon, supporting means for the spindles adjustable bodily, one with respect to the other, to position a cutter in intermeshing relationship with gears of different sizes on the work spindle, said supporting means being also adjustable angularly, one with respect to the other, to position a cutter in intermeshing relationship with respect to gears of different helix angles, means for reciprocating the cutter axially, means for shifting the cutter spindle to hold the cutter out of engagement with the blank during movement of the cutter in one direction, and means for feeding the cutter spindle laterally during its reciprocation to cause the cutter to be fed tangentially across the face of the blank.

26. In a gear shaper, a work spindle for supporting a gear blank, a cutter spindle adapted to have a gear shaped cutter thereon, means for supporting the spindles and for adjusting one angularly about an axis at right angles to the other to position the cutter and blank for generating gears of the desired helix angle, means for adjusting one of the spindles in the direction of said axis for generating gears of different diameters, means for reciprocating one of the spindles in the direction of the axis of the cutter spindle, and means for driving the spindles in their various positions of adjustment and for maintaining a predetermined relation between their speeds of rotation.

27. In a gear shaper, a work spindle for supporting a gear blank, a cutter spindle adapted to have a gear shaped cutter thereon, means for supporting the spindles and for adjusting one angularly about an axis at right angles to the other to position the cutter and blank for generating gears of the desired helix angle, means for adjusting one of the spindles in the direction of said axis for generating gears of different diameters, means for reciprocating one of the spindles in the direction of the axis of the cutter spindle, a drive shaft, means including change gears for driving the work spindle from said shaft, and means including change gears for driving the cutter spindle from said shaft.

28. In a gear shaper, a work spindle for supporting a gear blank, a cutter spindle adapted to have a gear shaped cutter thereon, means for supporting the spindles and for adjusting one angularly about an axis at right angles to the other to position the cutter and blank for generating gears of the desired helix angle, means for adjusting one of the spindles in the direction of said axis for generating gears of different diameters, means for reciprocating one of the spindles in the direction of the axis of the cutter spindle, means for driving the spindles in their various positions of adjustment and for maintaining a predetermined relation between their speeds of rotation, means for feeding the cutter spindle toward the axis of the work spindle during operation of the machine, and means controlled by the feeding means for varying the speed of rotation of one of the spindles.

29. In a gear shaper, a work spindle for supporting a gear blank, a cutter spindle adapted to have a gear shaped cutter thereon, means for supporting the spindles and for adjusting one angularly about an axis at right angles to the other to position the cutter and blank for generating gears of the desired helix angle, means for adjusting one of the spindles in the direction of said axis for generating gears of different diameters, means for reciprocating one of the spindles in the direction of the axis of the cutter spindle, means for driving the spindles in their various positions of adjustment and for maintaining a predetermined relation between their speeds of rotation, means for feeding one of the spindles transversely with respect to the other in a plane parallel to the axis of the latter to cause the cutter to be fed tangentially across the face of the blank, and means controlled by the feeding means for varying the speed of rotation of one of the spindles proportionally to the rate of feed movement.

30. In a gear shaper, a work spindle for supporting a gear blank, a cutter spindle adapted to have a gear shaped cutter thereon, means for supporting the spindles and for adjusting one angularly about an axis at right angles to the other to position the cutter and blank for generating gears of the desired helix angle, means for adjusting one of the spindles in the direction of said axis for generating gears of different diameters, a drive shaft, means operated by said shaft for reciprocating one of the spindles in the direction of the axis of the other, means operated by said drive shaft for feeding one of the spindles toward the axis of the other, and means operated by said shaft for driving the spindles in their various positions of adjustment and for maintaining a predetermined relation between their speeds of rotation.

31. In a gear shaper, a supporting frame, a supporting member mounted on said frame for angular adjustment about a fixed axis, a head mounted on said member for adjustment in the direction of said axis, a work spindle rotatably carried by said head and disposed at right angles to said axis, a second supporting member on said frame, a cutter spindle rotatably carried by said second supporting member and disposed at right angles to the axis of the first supporting member, means for reciprocating the cutter spindle axially, and means for rotatably driving said spindles and for maintaining a predetermined relation between their speeds of rotation.

32. In a gear shaper, a supporting frame, a supporting member mounted on said frame for angular adjustment about a fixed axis, a head mounted on said member for adjustment in the direction of said axis, a work spindle rotatably carried by said head and disposed at right angles to said axis, a second supporting member on said frame, a cutter spindle rotatably carried by said second supporting member and disposed at right angles to the axis of the first supporting member, means for reciprocating the cutter spindle axially, a drive shaft carried by said frame, and means including change gears for rotatably driving said spindles from said drive shaft.

33. In a gear shaper, a supporting frame, a supporting member mounted on said frame for angular adjustment about a fixed axis, a head mounted on said member for adjustment in the direction of said axis, a work spindle rotatably carried by said head and disposed at right angles to said axis, a second supporting member on said frame, a cutter spindle rotatably carried by said second supporting member and disposed at right angles to the axis of the first supporting member, means for reciprocating the cutter spindle axially, means for varying the length of stroke of the cutter, and means including a common drive shaft and change gears for rotatably driving said spindles.

34. In a gear shaper, a supporting frame, a supporting member mounted on said frame for angular adjustment about a fixed axis, a head mounted on said member for adjustment in the direction of said axis, a work spindle carried by said head and disposed at right angles to said axis, a second supporting member on said frame, a carriage on said second supporting member mounted for linear movement in a plane at right angles to the axis of the first supporting member in a direction transverse with respect to the work spindle, a cutter spindle carried by said carriage and extending transversely with respect to the direction of movement of the carriage, means for reciprocating the cutter spindle axially, means for moving said carriage, means including a common drive shaft and change gears for driving said spindles, and means controlled by the carriage moving means for varying the rate of rotation of the cutter spindle.

35. In a gear generating machine, a supporting frame, a supporting member mounted on the frame for angular adjustment about a fixed vertical axis, a head mounted for vertical adjustment on said supporting member, a horizontally disposed work spindle carried by said head, a carriage mounted on said frame for transverse horizontal movement, a horizontal longitudinally extending cutter spindle mounted on said carriage, means for driving the spindles at predetermined relative speeds, means for moving said carriage, and means controlled by said carriage moving means for varying the speed of rotation of the cutter spindle.

36. In a gear generating machine, a supporting frame, a supporting member mounted on the frame for angular adjustment about a fixed vertical axis, a head mounted for vertical adjustment on said supporting member, a horizontally disposed work spindle rotatably carried by said head, a cutter spindle rotatably mounted on said frame independently of said supporting member and extending substantially at right angles to said axis, means for reciprocating said cutter spindle axially, and means for rotatably driving said spindles at predetermined relative speeds.

37. In a gear generating machine, a supporting frame, a supporting member mounted on the frame for angular adjustment about a fixed vertical axis, a head mounted for vertical adjustment on said supporting member, a horizontally disposed work spindle carried by said head, a carriage mounted on said frame for transverse horizontal movement, a horizontal longitudinally extending cutter spindle mounted on said carriage, a drive shaft, means including change gears for driving said spindles from the drive shaft, means actuated by the drive shaft for moving said carriage, and means controlled by the carriage moving means for varying the speed of rotation of the cutter spindle.

38. In a gear generating machine, a supporting frame, a supporting member mounted on the frame for angular adjustment about a fixed vertical axis, a head mounted for vertical adjustment on said supporting member, a horizontally disposed work spindle carried by said head, a carriage mounted on said frame for transverse horizontal movement, a horizontal longitudinally extending cutter spindle mounted on said carriage, a drive shaft means for driving the work spindle from said shaft, means for driving the cutter spindle from said shaft including planetary gears, a rotatable carrier for said planetary gears, means for moving said carriage, and means operated by said carriage moving means for rotating said carrier.

39. In a gear shaper, a supporting frame, a rotatable work spindle supported thereby, means for rotating said work spindle, a carriage mounted for linear movement on the frame, a rotatable cutter spindle mounted on the carriage, a drive shaft, a second shaft driven from the drive shaft, a third shaft coaxially aligned with the second shaft, a differential comprising gears on the alined shafts, a rotatable carrier mounted to rotate about the axis of the alined shafts and planetary gearing on the carrier forming a driving connection between the gears on the alined shafts, means for driving said cutter spindle from the third shaft, means for moving the carriage, and means operated by the carriage moving means for rotating said carrier whereby the speed of rotation of the cutter spindle is correlated with respect to the imaginary generating rack of the gear being cut and the cutter is maintained in correct intermeshing engagement therewith during its feeding movement.

40. In a gear shaper, a supporting frame, a rotatable work spindle supported thereby, means for rotating said work spindle, a carriage mounted for linear movement on the frame, a rotatable cutter spindle mounted on the carriage, a drive shaft, a second shaft driven from the drive shaft, a third shaft coaxially aligned with the second shaft, a differential comprising gears on the alined shafts, a rotatable carrier mounted to rotate about the axis of the alined shafts and planetary gearing on the carrier forming a driving connection between the gears on the alined shafts, means for driving said cutter spindle from the third shaft, a lead screw for moving said carriage, means for actuating said screw from said drive shaft, and means including change gears for driving said carrier from said lead screw whereby the speed of rotation of the cutter spindle is correlated with respect to the imaginary generating rack of the gear being cut and the cutter is maintained in correct intermeshing engagement therewith during its feeding movement.

41. In a gear shaper, a supporting frame, a supporting member on the frame mounted for movement about a fixed axis, a shaft coaxial with said axis and having a worm thereon, a worm wheel journaled in said supporting member and meshing with said worm, a spindle having a spline connection with said worm wheel, means for driving said shaft, means for reciprocating said spindle axially, and means for oscillating said supporting member about its axis.

42. In a gear shaper, a supporting frame, a supporting member on the frame mounted for movement about a fixed axis, a shaft coaxial with said axis, and having a worm thereon, a worm wheel journaled in said supporting member and meshing with said worm, a spindle having a spline connection with said worm wheel, means for driving said shaft, means for reciprocating said spindle axially, and means operable at the ends of the stroke of the spindle for rocking said supporting member alternately in opposite directions about its pivotal axis.

43. In a gear shaper, a supporting frame, a supporting member on the frame mounted for movement about a fixed axis, a shaft coaxial with said axis and having a worm thereon, a worm wheel journaled in said supporting member and meshing with said worm, a spindle having a spline connection with said worm wheel, means for driving said shaft, means for reciprocating said spindle axially, means for varying the length of stroke of the spindle, and means operable at the ends of the stroke of the spindle for rocking said supporting member alternately in opposite directions about its pivotal axis.

44. In a gear shaper, a supporting frame, a supporting member on the frame mounted for movement about a fixed axis, a shaft coaxial with said axis and having a worm thereon, a worm wheel journaled in said supporting member and meshing with said worm, a spindle having a spline connection with said worm wheel, means for driving said shaft, means for reciprocating said spindle axially, means for varying the length of stroke of the spindle, and means operable at the ends of the stroke of the spindle for rocking said supporting member alternately in opposite directions about its pivotal axis.

45. In a gear shaper, a supporting frame, a supporting member on the frame mounted for movement about a fixed axis, a shaft coaxial with said axis and having a worm thereon, a worm wheel journaled in said supporting member and meshing with said worm, a spindle having a spline connection with said worm wheel, means for driving said shaft, means for reciprocating said spindle axially, a slide in which said spindle is journaled and held against endwise movement, a guide for said slide, means connected to said slide for reciprocating the slide and spindle, means for holding said slide against said guide during movement thereof in one direction and means for holding the slide away from the guide during its movement in the opposite direction.

46. In a gear shaper, a work spindle for supporting a gear blank, a cutter spindle adapted to have a cutter positioned thereon for engagement with a blank on the work spindle, means for supporting the spindles and for moving one laterally with respect to the other and in a plane parallel with the axis of the other to cause the cutter to be fed tangentially across the face of the blank, means for reciprocating one of the spindles in the direction of the axis of the cutter, and means for driving the spindles and for automatically correlating their speeds of rotation.

47. In a gear shaper, a work spindle for supporting a gear blank, a cutter spindle adapted to have a cutter positioned thereon for engagement with a blank on the work spindle, means for supporting the work spindle, a carriage for the cutter spindle mounted for movement transversely of the cutter spindle in a plane parallel to the work spindle, means for moving said carriage to feed the cutter transversely across the face of the blank, means for reciprocating the cutter spindle axially, and means for driving said spindles and for automatically correlating their speeds of rotation.

48. In a gear shaper, a work spindle for supporting a gear blank, a cutter spindle adapted to have a cutter positioned thereon for engagement with a blank on the work spindle, means for supporting the work spindle, a carriage for the cutter spindle mounted for movement transversely of the cutter spindle in a plane parallel to the work spindle, a support for said carriage adjustable in a direction at right angles to the direction of movement of the carriage, means for reciprocating the cutter spindle axially, means for varying the length of stroke of the cutter, means for moving said carriage laterally to feed the cutter tangentially across the face of the blank, and means for driving said spindles and for automatically correlating their speeds of rotation.

49. In a gear shaper, a work spindle for supporting a gear blank, a cutter spindle adapted to have a cutter positioned thereon for engagement with a blank on the work spindle, means for supporting the spindles and for moving one laterally with respect to the other and in a plane parallel with the axis of the other to cause the cutter to be fed tangentially across the face of the blank, means for reciprocating one of the spindles in the direction of the axis of the cutter, means for driving said spindles and means operated by said carriage moving means for controlling the relative speeds of rotation of the spindles.

50. In a gear shaper, a work spindle for supporting a gear blank, a cutter spindle adapted to have a cutter positioned thereon for engagement with a blank on the work spindle, means for supporting the work spindle, a carriage for the cutter spindle mounted for movement transversely of the cutter spindle in a plane parallel to the work spindle, means for moving said carriage to feed the cutter transversely across the face of the blank, means for reciprocating the cutter spindle axially, means for driving said spindles, and means operated by said carriage moving means for controlling the relative speeds of rotation of the spindles.

51. In a gear shaper, a work spindle for supporting a gear blank, a cutter spindle adapted to have a cutter positioned thereon for engagement with a blank on the work spindle, means for supporting the work spindle, a carriage for the cutter spindle mounted for movement transversely of the cutter spindle in a plane parallel to the work spindle, a support for said carriage adjustable in a direction at right angles to the direction of movement of the carriage, means for reciprocating the cutter spindle axially, means for varying the length of stroke of the cutter, means for moving said carriage laterally to feed the cutter tangentially across the face of the blank, means for driving said spindles at a predetermined speed ratio, and means controlled by said carriage moving means for varying said speed ratio.

52. In a gear shaper, a work spindle for supporting a gear blank, a cutter spindle adapted to have a cutter positioned thereon for engagement with the blank, means for supporting the spindles and for moving one laterally with respect to the other and in a plane parallel with the axis of the other to cause the cutter to be fed tangentially across the face of the blank, means for driving the spindles and for automatically correlating their speeds of rotation, means for reciprocating one of the spindles in the direction of the axis of the cutter, and means for automatically swinging one of the spindles about an axis transverse thereto alternately in opposite directions at the ends of the stroke of the reciprocating spindle to disengage the cutter from the blank during relative movement in one direction.

53. In a machine of the character described, a supporting frame, a main drive shaft carried by said frame, a cutter spindle rotatably driven by said drive shaft, a supporting member mounted for angular adjustment about a fixed axis on the frame, a head mounted on said member for adjustment in the direction of said axis, a work spindle journaled in said head and extending at right angles to said axis, a shaft journaled in said frame at the axis of said supporting member, means operatively connecting said drive shaft with said last named shaft, a second shaft journaled in the supporting member and radially disposed with respect to said axis, a third shaft journaled in the supporting member and extending parallel with said axis, a fourth shaft mounted in the head and extending at right angles to the work spindle and to said third shaft and across the spindle at right angles thereto, bevel gearing connecting said shafts whereby they are all driven by said drive shaft, a worm on said fourth shaft, and a worm wheel on said work spindle meshing with said worm.

54. In a machine of the character described, a supporting frame, a main drive shaft carried by said frame, a cutter spindle rotatably driven by said drive shaft, a supporting member mounted for angular adjustment about a fixed axis on the frame, a head mounted on said member for adjustment in the direction of said axis, a work spindle journaled in said head and extending at right angles to said axis, a shaft journaled in said frame at the axis of said supporting member, means operatively connecting said drive shaft with said last named shaft, a second shaft journaled in the supporting member and radially disposed with respect to said axis, a third shaft journaled in the supporting member and extending parallel with said axis, a fourth shaft mounted in the head and extending at right angles to the work spindle and to said third shaft and across the spindle at right angles thereto, bevel gearing connecting said shafts whereby they are all driven by said drive shaft, a worm on said fourth shaft, a worm wheel on said work spindle meshing with said worm, and means for adjusting said fourth shaft in the head toward and away from the axis of the work spindle.

55. In a gear shaper, a supporting frame, a carriage mounted for linear movement on the frame, a head on said carriage mounted for movement about an axis fixed with respect to the carriage and extending in the direction of movement of the carriage, a slide on said head mounted for movement in a direction at right angles to said axis, a spindle journaled in said slide, said spindle extending in the direction of movement of the slide, and being held against endwise movement with respect thereto, means for imparting linear movement to said carriage, means for reciprocating said slide, means for oscillating said head, a drive shaft mounted on the supporting frame, and means for driving said spindle from said drive shaft during movements of the carriage head and slide.

56. In a gear shaper, a supporting frame, a carriage mounted for linear movement on the frame, a head on said carriage mounted for movement about an axis fixed with respect to the carriage and extending in the direction of movement of the carriage, a slide on said head mounted for movement in a direction at right angles to said axis, a spindle journaled in said slide, said spindle extending in the direction of movement of the slide and being held against endwise movement with respect thereto, means for imparting linear movement to said carriage, a drive shaft mounted on the supporting frame, and means actuated by said drive shaft for reciprocating said slide, for oscillating said head and for driving said spindle.

57. In a gear shaper, a supporting frame, a carriage mounted for linear movement on the frame, a head on said carriage mounted for movement about an axis fixed with respect to the carriage and extending in the direction of movement of the carriage, a slide on said head mounted for movement in a direction at right angles to said axis, a spindle journaled in said slide, said spindle extending in the direction of movement of the slide and being held against endwise movement with respect thereto, a driving element journaled in said head coaxial with said spindle and splined thereto, means for driving said element including telescopically connected driving elements mounted on the carriage and frame and coaxial with the pivotal axis of the head, means for imparting linear movement to the carriage, means for reciprocating said slide, and means for oscillating said head.

58. In a gear shaper, a supporting frame, a carriage mounted for linear movement on the frame, a head on said carriage mounted for movement about an axis fixed with respect to the carriage and extending in the direction of movement of the carriage, a slide on said head mounted for movement in a direction at right angles to said axis, a spindle journaled in said slide, said spindle extending in the direction of movement of the slide and being held against endwise movement with respect thereto, a driving element journaled in said head coaxial with said spindle and splined thereto, means for driving said element including telescopically connected driving elements mounted on the carriage and frame and coaxial with the pivotal axis of the head, means for imparting linear movement to the carriage, means for reciprocating said slide, and means for automatically moving said head about its pivotal axis alternately in opposite directions at the ends of the stroke of the slide.

59. In a gear shaper, a supporting frame, a carriage mounted for linear movement on the frame, a head on said carriage mounted for movement about an axis fixed with respect to the carriage and extending in the direction of movement of the carriage, a slide on said head mounted for movement in a direction at right angles to said axis, a spindle journaled in said slide, said spindle extending in the direction of movement of the slide and being held against endwise movement with respect thereto, a driving element journaled in said head coaxial with said spindle and splined thereto, means for driving said element including telescopically connected driving elements mounted on the carriage and frame and coaxial with the pivotal axis of the head, means for imparting linear movement to the carriage, means for reciprocating said slide, means for automatically moving said head about its pivotal axis alternately in opposite directions at the ends of the stroke of the slide, and means for constraining the slide to movement in a straight line during its travel in one direction.

60. In a gear shaper, a supporting frame, a carriage mounted for linear movement on the frame, a head mounted for pivotal movement on the carriage about an axis extending in the direction of movement of the carriage, a driving element journaled in the carriage in axial alinement with the pivotal axis of the head, a second driving element journaled in the head with its axis disposed transversely with respect to that of the first driving element, means for driving said second driving element from the first mentioned driving element, a spindle splined in said second driving element, means for imparting linear movement to said carriage, a drive shaft mounted on the supporting frame, and means actuated by said shaft for reciprocating said spindle axially, for oscillating said head about its pivotal axis and for driving said spindle through said driving elements.

61. In a gear shaper, a supporting frame, a carriage mounted for linear movement on the frame, a head mounted for pivotal movement on the carriage about an axis extending in the direction of movement of the carriage, a driving element journaled in the carriage in axial alinement with the pivotal axis of the head, a second driving element journaled in the head with its axis disposed transversely with respect to that of the first driving element, means for driving said second driving element from the first mentioned driving element, a spindle splined in said second driving element, a drive shaft mounted on the supporting frame, and means actuated by the shaft for moving said carriage, for reciprocating said spindle axially, for oscillating said head and for continuously driving said spindle.

62. In a gear shaper, a supporting frame, a carriage mounted for linear movement on the frame, a head mounted for pivotal movement on the carriage about an axis extending in the direction of movement of the carriage, a driving element journaled in the carriage in axial alinement with the pivotal axis of the head, a second driving element journaled in the head with its axis disposed transversely with respect to that of the first driving element, means for driving said second driving element from the first mentioned driving element, a spindle splined in said second driving element, means for imparting linear movement to said carriage, a drive shaft mounted on the supporting frame, and means controlled by movement of the carriage for varying the speed of rotation of the spindle.

63. In a gear shaper, a supporting frame, a carriage mounted for linear movement on the frame, a head mounted for pivotal movement on the carriage about an axis extending in the direction of movement of the carriage, a driving element journaled in the carriage in axial alinement, with the pivotal axis of the head, a second driving element journaled in the head with its axis disposed transversely with respect to that of the first driving element, means for driving said second driving element from the first mentioned driving element, a spindle splined in said second driving element, means for imparting linear movement to said carriage, means including a planetary gearing for driving said spindle from said drive shaft, means operated by said carriage moving means for actuating the planetary gearing to vary the speed of rotation of the spindle, means for reciprocating the spindle axially, and means for oscillating said head about its pivotal axis.

64. In a gear shaper, a supporting frame, a carriage mounted for linear movement on the frame and having axially alined bearing apertures, a head having trunnions journaled in said apertures, a shaft journaled in the head, said shaft being coaxial with the trunnions and extending through one of the trunnions, a worm fixed to said shaft within the head, a worm wheel journaled in the head and meshing with said worm, a cutter spindle splined in said worm wheel, a drive shaft mounted in the supporting frame, means for driving the worm shaft from said drive shaft, means for moving the carriage, means for reciprocating the cutter axially, and means for oscillating said head on its trunnions.

65. In a gear shaper, a supporting member having axially alined bearing apertures, a head comprising a rigid cross member having trunnions journaled in said apertures and a housing carried by said cross member, means for adjusting said housing on the cross member in a direction transverse with respect to the axis of the trunnions, a shaft journaled in the cross member coaxial with the trunnions and extending through one of the trunnions, a worm fixed to said shaft, a worm wheel journaled in the housing and meshing with said worm, a spindle splined in said worm wheel, driving means having a driving connection with the projecting end of the worm shaft, means for reciprocating the spindle axially, and means for oscillating said head on said trunnions.

66. In a gear shaper, a supporting member having axially alined bearing apertures, a head comprising a rigid cross member having trunnions journaled in said apertures and a housing carried by said cross member, means for adjusting said housing on the cross member in a direction transverse with respect to the axis of the trunnions, a shaft journaled in the cross member coaxial with the trunnions and extending through one of the trunnions, a worm fixed to said shaft, a worm wheel journaled in the housing and meshing with said worm, a spindle splined in said worm wheel, driving means having a driving connection with the projecting end of the worm shaft, means for reciprocating the spindle axially, and means controlled by the spindle reciprocating means for swinging said head alternately in opposite directions on its trunnions at the ends of the stroke of the spindle.

67. In a gear shaper, a supporting member having axially alined bearing apertures, a head having trunnions journaled in said apertures, said head having a guideway extending in a direction transverse to the axis of the trunnion, a slide mounted in said guideway, a shaft mounted in the head coaxial with the trunnions and extending through one of the trunnions, a worm fixed to said shaft, a worm wheel journaled in the head and meshing with said worm, a spindle journaled in said slide and held against endwise movement in the slide, said spindle being splined to said worm wheel, means for driving said worm shaft, means for reciprocating said slide, and means for oscillating said head on its trunnions.

68. In a gear shaper, a supporting member having axially alined bearing apertures, a head having trunnions journaled in said apertures, said head having a guideway extending in a direction transverse to the axis of the trunnion, a slide mounted in said guideway, a shaft mounted in the head coaxial with the trunnions and extending through one of the trunnions, a worm fixed to said shaft, a worm wheel journaled in the head and meshing with said worm, a spindle journaled in said slide and held against endwise movement in the slide, said spindle being splined to said worm wheel, means for driving said worm shaft, means for reciprocating said slide, means for limiting the angular movement of the head and means for automatically swinging the head on its trunnions in opposite directions at the opposite ends of the stroke of the spindle.

69. In a gear shaper, a supporting member having axially alined bearing apertures, a head having trunnions journaled in said apertures, said head having a guideway extending in a direction transverse to the axis of the trunnion, a slide mounted in said guideway, a shaft mounted in the head coaxial with the trunnions and extending through one of the trunnions, a worm fixed to said shaft, a worm wheel journaled in the head and meshing with said worm, a spindle journaled in said slide and held against endwise movement in the slide, said spindle being splined to said worm wheel, means for driving said worm shaft, means for reciprocating said slide, means for varying the length of stroke of the spindle, relatively fixed stop members for limiting the angular movement of the head, and means controlled by the spindle reciprocating means for automatically shifting the head on its trunnions from a position in engagement with one stop member to a position in engagement with the other at each end of the stroke of said spindle.

70. In a gear shaper, a supporting member having axially alined bearing apertures, a head having trunnions journaled in said apertures, said head having a guideway extending in a direction transverse to the axis of the trunnion, a slide mounted in said guideway, a shaft mounted in the head coaxial with the trunnions and extending through one of the trunnions, a worm fixed to said shaft, a worm wheel journaled in the head and meshing with said worm, a spindle journaled in said slide and held against endwise movement in the slide, said spindle being splined to said worm wheel, means for driving said worm shaft, means for reciprocating said slide, a shaft journaled in the supporting member and extending transversely of said spindle, means connecting said shaft and slide for imparting reciprocating movements to the slide, and means including a cam on said shaft for imparting oscillating movements to said head.

71. In a gear shaper, a supporting frame, a supporting member mounted for linear adjustment on the frame, a carriage mounted on said supporting member for linear movement transversely of the line of adjustment of the supporting member, a head pivotally mounted on said carriage to swing about an axis extending in the direction of movement of the carriage, a spindle mounted for axial movement in the head and extending transversely of the pivotal axis of the head, means for imparting linear movement to the carriage, means for reciprocating the spindle, means controlled by the spindle reciprocating means for oscillating said head, and means for continuously driving said spindle during its lateral axial and oscillatory movements.

72. In a gear shaper, a supporting frame, a supporting member mounted for linear adjustment on the frame, a carriage mounted on said supporting member for linear movement transversely of the line of adjustment of the supporting member, a head pivotally mounted on said carriage to swing about an axis extending in the direction of movement of the carriage, a spindle mounted for axial movement in the head and extending transversely of the pivotal axis of the head, a drive shaft on the supporting frame, and means actuated by said drive shaft for reciprocating said spindle axially, for oscillating said head, for imparting linear movement to the carriage and for continuously driving said spindle.

73. In a machine of the character described, a supporting frame, a carriage mounted for linear movement on the frame, a spindle mounted for axial reciprocating movements on the carriage and extending at right angles to the direction of movement of the carriage, a drive shaft on the frame, means actuated by said shaft for reciprocating the spindle and for continuously driving the spindle, a screw feed mechanism for moving said carriage including a ratchet mounted on the screw, a movably mounted pawl for actuating said ratchet, and means operated by said drive shaft for actuating the pawl to impart intermittent turning movements to the ratchet.

74. In a machine of the character described, a supporting frame, a carriage mounted for linear movement on the frame, a spindle mounted for axial reciprocating movements on the carriage and extending at right angles to the direction of movement of the carriage, a drive shaft on the frame, means actuated by said shaft for reciprocating the spindle and for continuously driving the spindle, a screw feed mechanism for moving said carriage including a ratchet mounted on the screw, a movably mounted pawl for actuating said ratchet, means operated by said drive shaft for actuating the pawl to impart intermittent turning movement to the ratchet, and gearing connecting said ratchet and spindle for varying the speed of rotation of the spindle in proportion to the angular speed of the ratchet.

75. In a machine of the character described, a supporting frame, a carriage mounted for linear movement on the frame, a spindle mounted for axial reciprocating movements on the carriage and extending at right angles to the direction of movement of the carriage, a drive shaft on the frame, means actuated by said shaft for reciprocating the spindle and for continuously driving the spindle, a screw feed mechanism for moving said carriage including a ratchet mounted on the screw, a movably mounted pawl for actuating said ratchet, means operated by said drive shaft for actuating the pawl to impart intermittent turning movements to the ratchet, and means operated by the ratchet for shifting said pawl out of ratchet engaging position after a predetermined rotary movement of the ratchet.

76. In a gear shaper, a supporting frame, a carriage mounted for linear travel on the frame, a head mounted on the carriage for rocking movements about a pivotal axis extending in the direction of movement of the carriage, a slide mounted on said head for linear movement in a direction at right angles to the direction of movement of the carriage, a cutter spindle carried by the slide and extending in the direction of movement of the slide, a driving element rotatably mounted in the head and splined to the spindle, means for driving said driving element including coaxial splined driving elements on the carriage and supporting frame, and means for reciprocating said slide and for rocking said head.

77. In a gear shaper, a supporting frame, a carriage mounted for linear travel on the frame, a head mounted on the carriage for rocking movements about a pivotal axis extending in the direction of movement of the carriage, a slide mounted on said head for linear movement in a direction at right angles to the direction of movement of the carriage, a cutter spindle carried by the slide and extending in the direction of movement of the slide, a driving element rotatably mounted in the head and splined to the spindle, means for driving said driving element including coaxial splined driving elements on the carriage and supporting frame, and means for reciprocating said slide and for rocking said head, including actuating elements rotatably mounted on the carriage with their axes parallel with the line of movement of the carriage and shafts mounted on the supporting frame and splined to said actuating elements.

78. In a machine of the character described, a supporting frame, a supporting member mounted for angular adjustment about a fixed axis on the frame, a head mounted on said member for adjustment in the direction of said axis, a spindle journaled in said head and extending at right angles to said axis, a carriage on said supporting frame and mounted for linear movement, a transversely extending spindle on said carriage and movable therewith, and means for reciprocating said last named spindle axially whereby said last named spindle has both axial and lateral movement in a plane fixed with respect to said supporting frame.

79. In a gear shaper, a cutter spindle, a work spindle, means for rotating said spindles so that a gear shaped cutter and blank carried thereby are in intermeshing relation, means for relatively reciprocating said spindles to move said cutter and blank transversely of their faces, and means for simultaneously moving one of the spindles laterally along a path lying in a plane parallel to the plane of the axis of the other spindle to bring the cutter and gear blank carried thereby closer together.

80. A gear shaper comprising a cutter spindle adapted to have a gear shaper cutter arranged thereon, a work spindle adapted to have a gear blank arranged thereon, the axes of said cutter and work spindles lying in parallel planes, means for rotating said spindles with the gear shaped cutter and gear blank in intermeshing relation, means for angularly disposing the axes of said spindles, means for relatively reciprocating said spindles to cause said cutter and blank to move transversely of their faces, and means for simultaneously relatively moving said spindles laterally in paths lying respectively in the said planes of their axes to bring said cutter and blank closer together.

OLIVER G. SIMMONS.